United States Patent
Majd

(10) Patent No.: US 12,045,643 B1
(45) Date of Patent: Jul. 23, 2024

(54) POWER AWARE LOAD PLACEMENT FOR SUB-LINEUPS

(71) Applicant: Amazon Technologies, Inc., Seattle, WA (US)

(72) Inventor: Afshin Majd, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 507 days.

(21) Appl. No.: 17/338,532

(22) Filed: Jun. 3, 2021

(51) Int. Cl.
- *G06F 9/455* (2018.01)
- *G06F 9/48* (2006.01)
- *G06F 9/50* (2006.01)

(52) U.S. Cl.
CPC .......... *G06F 9/45558* (2013.01); *G06F 9/455* (2013.01); *G06F 9/48* (2013.01); *G06F 9/4806* (2013.01); *G06F 9/4843* (2013.01); *G06F 9/4881* (2013.01); *G06F 9/4893* (2013.01); *G06F 9/50* (2013.01); *G06F 9/505* (2013.01); *G06F 9/5072* (2013.01);
(Continued)

(58) Field of Classification Search
CPC .................. G06F 9/455; G06F 9/45558; G06F 2009/4557; G06F 2009/45595; G06F 9/48; G06F 9/4806; G06F 9/4843; G06F 9/4881; G06F 9/4893; G06F 9/50; G06F 9/505; G06F 9/5072; G06F 9/5094
See application file for complete search history.

(56) References Cited

U.S. PATENT DOCUMENTS

| | | |
|---|---|---|
| 8,533,724 B1 | 9/2013 | Theimer et al. |
| 8,856,483 B1 | 10/2014 | Paterson-Jones et al. |
| 9,336,030 B1 | 5/2016 | Marr et al. |

(Continued)

FOREIGN PATENT DOCUMENTS

| | | |
|---|---|---|
| WO | 2014/182894 A2 | 11/2014 |
| WO | 2018/217387 A1 | 11/2018 |

OTHER PUBLICATIONS

Afshin Majd et al., U.S. Appl. No. 16/457,334, filed Jun. 28, 2019, entitled "Power Supply Shedding for Power Efficiency Optimization", 33 pages.

(Continued)

*Primary Examiner* — Charles M Swift
(74) *Attorney, Agent, or Firm* — NICHOLSON DE VOS WEBSTER & ELLIOTT LLP

(57) ABSTRACT

Techniques are described for enabling a service provider to determine the power utilization of electrical lineups and sub-lineups powering physical servers in a data center and place virtual machine instances into the physical servers based on the power utilization and a user-specified preference of a virtual machine instance type. In one embodiment, a computer-implemented method includes determining a power utilization for each sub-lineup of a plurality of sub-lineups of each lineup of a plurality of lineups, wherein each sub-lineup comprises a plurality of racks of physical servers, selecting a sub-lineup for the virtual machine instance based at least in part on the power utilizations for the plurality of sub-lineups, selecting a virtual machine slot for the virtual machine instance from a plurality of candidate virtual machine slots of the physical servers of the sub-lineup based on the user-specified preference, and causing the virtual machine slot of a physical server of the sub-lineup to execute the virtual machine instance.

20 Claims, 10 Drawing Sheets

(52) U.S. Cl.
CPC .... *G06F 9/5094* (2013.01); *G06F 2009/4557* (2013.01); *G06F 2009/45595* (2013.01)

(56) References Cited

U.S. PATENT DOCUMENTS

| | | |
|---|---|---|
| 9,448,820 B1 | 9/2016 | Allen |
| 9,471,352 B1 | 10/2016 | Mauer et al. |
| 9,514,485 B1 | 12/2016 | De et al. |
| 9,652,326 B1 | 5/2017 | Bauer et al. |
| 9,722,866 B1 | 8/2017 | Brooker et al. |
| 9,820,409 B1 | 11/2017 | Ross et al. |
| 9,826,030 B1 | 11/2017 | Dhoolam et al. |
| 9,874,924 B1 | 1/2018 | Li |
| 10,211,630 B1 | 2/2019 | Clidaras et al. |
| 10,395,219 B1 | 8/2019 | Mentz et al. |
| 10,613,888 B1 | 4/2020 | Mentz et al. |
| 10,869,405 B1 | 12/2020 | Bailey et al. |
| 11,080,097 B1 | 8/2021 | Panghal et al. |
| 11,303,509 B2 | 4/2022 | Brooker et al. |
| 2009/0234512 A1 | 9/2009 | Ewing et al. |
| 2011/0077795 A1* | 3/2011 | VanGilder ............... G06F 1/206 700/300 |
| 2012/0005675 A1 | 1/2012 | De Waal |
| 2012/0072762 A1 | 3/2012 | Atchison et al. |
| 2013/0014101 A1 | 1/2013 | Ballani et al. |
| 2013/0097319 A1 | 4/2013 | Ahmad et al. |
| 2013/0097464 A1 | 4/2013 | Ahmad et al. |
| 2014/0047444 A1 | 2/2014 | Yamaguchi |
| 2014/0059207 A1 | 2/2014 | Gulati et al. |
| 2014/0157008 A1 | 6/2014 | Ammu et al. |
| 2014/0277784 A1 | 9/2014 | Mick et al. |
| 2015/0113144 A1 | 4/2015 | Bauer et al. |
| 2015/0199215 A1 | 7/2015 | Mankovskii et al. |
| 2015/0227397 A1 | 8/2015 | Gogula et al. |
| 2015/0261577 A1* | 9/2015 | Gilbert .................. G06F 9/5077 718/1 |
| 2016/0043968 A1 | 2/2016 | Jacob et al. |
| 2016/0170848 A1 | 6/2016 | Yang et al. |
| 2016/0188357 A1 | 6/2016 | Ahmad et al. |
| 2016/0299772 A1 | 10/2016 | Seenappa et al. |
| 2017/0046206 A1 | 2/2017 | Kofkin-Hansen et al. |
| 2017/0109205 A1 | 4/2017 | Ahuja et al. |
| 2017/0135250 A1 | 5/2017 | Inano et al. |
| 2017/0139729 A1 | 5/2017 | Cropper et al. |
| 2018/0024700 A1 | 1/2018 | Dadd et al. |
| 2018/0026851 A1 | 1/2018 | Adiletta et al. |
| 2018/0032361 A1 | 2/2018 | Manickam et al. |
| 2018/0077820 A1 | 3/2018 | Davis |
| 2018/0095774 A1 | 4/2018 | Atta et al. |
| 2018/0124072 A1 | 5/2018 | Hamdi |
| 2018/0192539 A1 | 7/2018 | Sakalkar et al. |
| 2018/0260200 A1 | 9/2018 | Karagiannis et al. |
| 2019/0050036 A1 | 2/2019 | Hall et al. |
| 2019/0068696 A1* | 2/2019 | Sen ..................... G06F 11/3006 |
| 2019/0163538 A1 | 5/2019 | Klein et al. |
| 2019/0188022 A1 | 6/2019 | Jung et al. |
| 2019/0384668 A1 | 12/2019 | Aiyar et al. |
| 2020/0310886 A1* | 10/2020 | Rajamani ............ G06F 9/45558 |
| 2020/0348978 A1 | 11/2020 | Stephen |
| 2021/0089376 A1 | 3/2021 | Glade et al. |
| 2021/0103458 A1 | 4/2021 | Manousakis et al. |
| 2021/0127523 A1 | 4/2021 | Bailey et al. |
| 2021/0200760 A1 | 7/2021 | Bui et al. |

OTHER PUBLICATIONS

International Search Report and Written Opinion, PCT App. No. PCT/US2020/034896, Sep. 10, 2020, 14 pages.
Non Final Office Action, U.S. Appl. No. 16/429,728, filed Nov. 17, 2020, 28 pages.
Non-Final Office Action, U.S. Appl. No. 16/900,789, filed Jun. 30, 2022, 28 pages.
Notice of Allowance, U.S. Appl. No. 16/799,582, filed Sep. 16, 2022, 15 pages.
Non-Final Office Action, U.S. Appl. No. 16/799,582, filed Jun. 9, 2022, 32 pages.
Notice of Allowance, U.S. Appl. No. 16/429,728, filed Mar. 24, 2022, 10 pages.
Amazon Web Services, Inc., "Working with Dedicated Hosts", Amazon Elastic Cloud Compute, Available Online: https://docs.aws.amazon.com/AWSEC2/latest/UserGuidelhow-dedicated-hosts-work.html#/dedicated-hosts-understanding, May 16, 2019, 17 pages.
Final Office Action, U.S. Appl. No. 16/429,728, filed Jun. 11, 2021, 32 pages.
Non-Final Office Action U.S. Appl. No. 16/429,728, filed Sep. 30, 2021, 35 pages.
Non-Final Office Action, U.S. Appl. No. 16/799,582, filed Sep. 2, 2021, 49 pages.
Final Office Action, U.S. Appl. No. 16/799,582, filed Mar. 9, 2022, 30 pages.

* cited by examiner

POWER AWARE LOAD PLACEMENT FOR SUB-LINEUPS

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
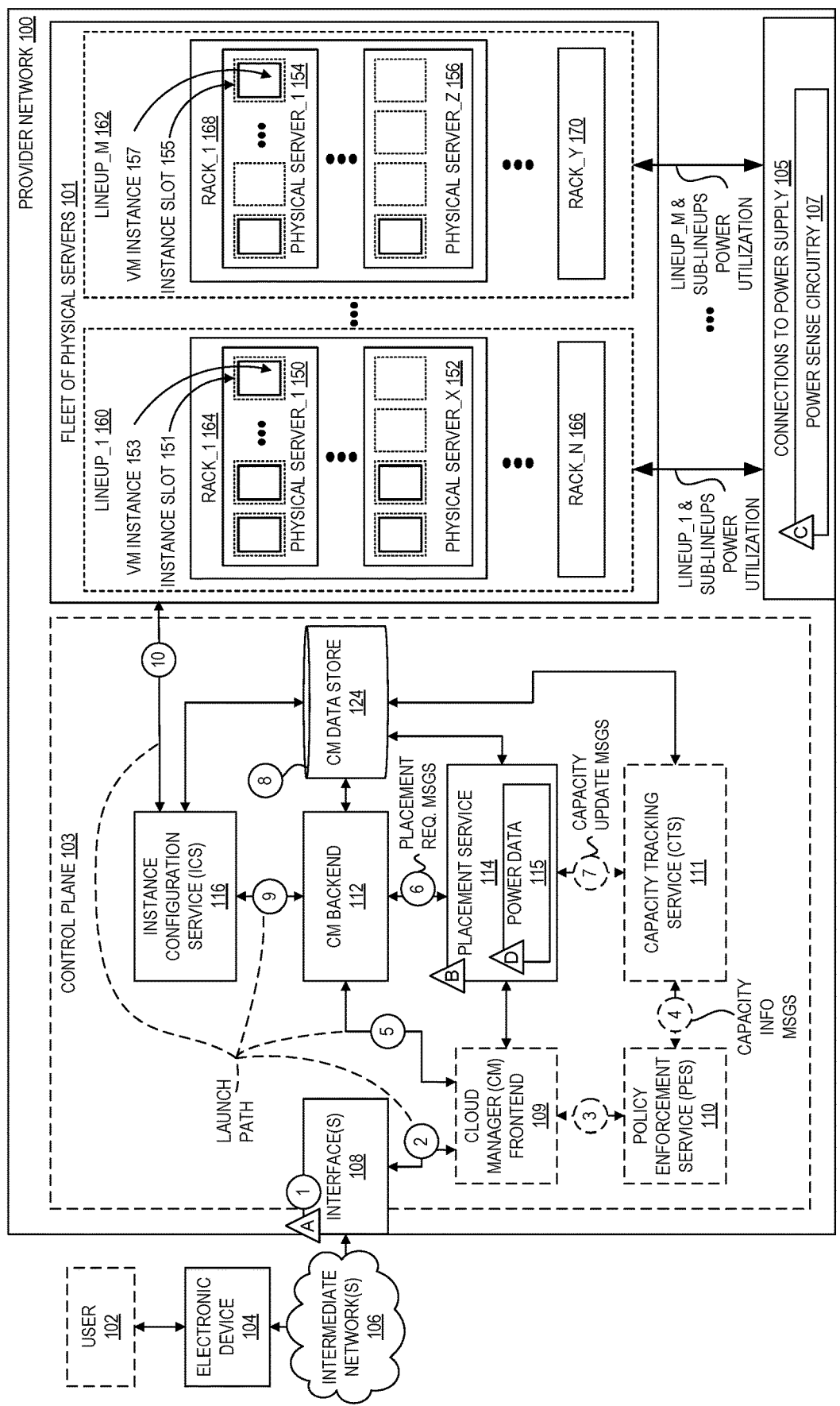
FIG. 1 is a diagram illustrating an environment that enables users of a service provider to configure one or more virtualized computing resource preferences to be used along with power data for a fleet of physical servers to place virtualized computing resources into the fleet of physical servers according to some embodiments.

Various embodiments of methods, apparatus, systems, and non-transitory computer-readable storage media are described for enabling a placement service that launches virtualized computing resources based at least in part on power utilization data for each electrical sub-lineup of a plurality of electrical sub-lineups that feed a plurality of respective racks of physical servers. The power utilization data may be used by the placement service in addition to one or more virtualized computing resource preferences for a placement decision. The virtualized computing resource preferences and power utilization data can be used to determine at which physical server (e.g., which rack or set of racks) the virtualized computing resources—for example, virtual machine (VM) instances, containers, and the like—are launched in response to launch requests. Virtualized computing resource preferences may include a preference for an instance type for a virtual machine instance. An instance type may determine the hardware used by the physical server to host the instance. An instance type may include different compute, memory, and/or storage capabilities for an instance.

Among other benefits, providing the placement service visibility into the power utilization (e.g., on a per sub-lineup granularity, in addition to or alternatively to a per lineup granularity) enables the placement service to prioritize the sub-lineup(s) with lower utilization to place customer instances to achieve a higher electrical lineup (and sub-lineup) utilization (ELU), drive down deviation and reduce the mean-to-peak lineup (and sub-lineup) loading ratio, decrease the number of new power peak events, increase the energy efficiency and power factor (PF) (e.g., for certain power supply units (PSUs) that work at their best efficiency, and power factor (PF), if maintained at a certain (e.g., about 60%) power utilization), improve availability of resources, reduce electrical usage costs, and/or support a smoother increase of infrastructure utilization to a higher percentage.

Service providers of virtualization technologies and other services may have one or more fleets of computer systems and other equipment that form the infrastructure (for example, physical computer systems, networking systems, storage systems, power systems) on which to host virtualized computing resources and other services. In many cases, users can make use of such virtualization technologies with little awareness of the underlying physical hardware supporting their virtualized computing resources. Furthermore, users may often have little to no awareness of, or visibility into, virtualized computing resources associated with other users of the service provider running on the same physical hardware as the user's virtualized computing resources. Thus, a service provider may be tasked with placement of the virtualized computing resources to a particular physical server, rack of physical servers, sub-lineup, or lineup of a plurality of racks of physical servers. The placement task may be serviced by a placement service of the service provider. A user may not be responsible for the placement task (e.g., decision) for a virtualized computing resource, but may indicate one or more virtualized computing resource preferences, for example, the compute, memory, and/or storage capabilities preferred for that instance.

According to embodiments described herein, a service provider obtains and processes power utilization for each (e.g., individually powered) lineup and/or its sub-lineups of a host fleet to provide power aware load placement of virtualized computing resources into the host fleet. The power data obtained by the service provider may include power utilization and/or a power topology of the lineups that indicates the physical servers of each lineup and/or its sub-lineups.

Embodiments herein may thus place virtualized computing resources (e.g., virtual machine instances) into a host fleet of physical servers with awareness of the power utilization of each electrical lineup and/or its sub-lineups of the host fleet, for example, instead of only placing virtualized computing resources anywhere available as long as the electrical lineup and/or its sub-lineups was not flagged as exceeding a power utilization threshold (e.g., a lineup and/or its sub-lineups being "hot"). Power unaware load placement leads to an unnecessary power draw variance across lineups and/or their sub-lineups in the same data center (or availability zone) and thus adds risk by pushing a part of the fleet to the limit while one or more of the other parts remain partially idle.

Embodiments herein provide for a power aware placement service (e.g., load-balancer thereof) that analyzes streams of power utilization data. In one embodiment, a power aware placement service sorts the power utilization data (e.g., from most utilized lineup and/or sub-lineup to a least utilized lineup and/or sub-lineup) and vends the ranking for placement, e.g., enabling placement on lower/lowest utilized lineup(s) and/or sub-lineups(s). In one embodiment, a power aware placement service improves overall fleet load balancing at a given (e.g., maximum) power utilization threshold (e.g., ceiling). In one embodiment, a power aware placement service allows for the raising (or lowering) of the power utilization threshold (e.g., ceiling). In one embodiment, a power aware placement service allows for a second (e.g., lower) power utilization threshold (e.g., lower than the first power threshold selected to not trip a breaker of the circuit powering the lineup and/or a breaker of the circuit powering the sub-lineup) to optimize the power utilization of one or more PSUs at their target power utilization (e.g., as the second power utilization threshold).

Embodiments herein provide for a power aware placement service (e.g., load-balancer thereof) that does not overprovision the hardware resources to handle load peaks. Embodiments herein allow a service provider to regulate the load on their power lineups and/or sub-lineups with minimal and predictable variation, e.g., and thus to push the power utilization threshold higher to use their infrastructure capacity more effectively and create electrical and monetary savings. Embodiments herein provide for a power aware electrical load balancing that spreads load increases (e.g., equally) across lineups and/or their sub-lineups.

In one embodiment, a power aware placement service (e.g., load-balancer or ranker thereof) has power utilization data down to only a per lineup level, e.g., as the smallest distinguishable power utilization data level. However, in certain embodiments, a single lineup feeds (e.g., provides power to) multiple components (e.g., including a bus (e.g., busbar) that feeds multiple sets of racks), e.g., a lineup feeding multiple (e.g., two) cold aisles (e.g., three bus ways each with a respective circuit breaker).

For example, in one embodiment, each lineup has a maximum power consumption (e.g., about 2 megawatts (MW)), but each of its components (e.g., sub-components) has their own maximum power consumption (e.g., lower than the lineup's). Embodiments herein provide for a power aware placement service (e.g., load-balancer or ranker thereof) that has power utilization data down to a sub-lineup level, e.g., as the smallest distinguishable power utilization data level. As an example topology, a lineup may include a circuit breaker having a first rating (e.g., 4000 Amperes (A)) and each set (e.g., sub-lineup) of a plurality of sets of components includes a respective circuit breaker (e.g., 800 A). In this example, a power aware placement service (e.g., load-balancer or ranker thereof) that has power utilization data down to only a per lineup level detects that a lineup has not reached its power utilization threshold (e.g., 80%) and thus indicates that lineup can have further utilization, but one of its sub-components may have reached its power utilization threshold (e.g., 80%) in certain embodiments, e.g., while the lineup's circuit breaker (e.g., 4000 A) sees (e.g., measures) less than a target level of current flowing through it (e.g., 2800 A) (e.g., less than 80% utilization), one of the downstream (e.g., 800 A) breakers for a sub-lineup sees (e.g., measures) more than a target level of current flowing through it (e.g., 750 A) (e.g., greater than the threshold 80% at a 93% utilization). In other words, the (e.g., 800 A) sub-lineup breaker runs a high risk of tripping hence dropping racks, while lineup utilization is below its power utilization threshold (e.g., 80%).

Embodiments herein send power utilization data that is down to a sub-lineup level, e.g., as the smallest distinguishable power utilization data level, to a placement service (e.g., a ranker thereof), for example, in addition to power utilization data for a lineup level. Embodiments herein provide power utilization for each sub-lineup of a plurality of sub-lineups of each lineup of a plurality of lineups, wherein each lineup comprises a plurality of racks of physical servers and each sub-lineup comprises a proper subset of racks of the plurality of racks of physical servers. As each sub-lineup covers a lesser number of racks compared to a full line up, the ranker (e.g., algorithm) is to apply only to those racks in certain embodiments. In one embodiment, the lineup utilization is compared with the utilization of its (e.g., main) sub-lineups, e.g., and only the largest of them gets passed to the placement service. In certain embodiments, a placement service also receives information about the number of (e.g., and identification of) racks connected to that sub-lineup. In one embodiment, if the utilization of a lineup is the highest among that lineup and its sub-lineups, only the power utilization data down to a per lineup level is utilized (e.g., sent to the placement service).

Additionally or alternatively, embodiments herein allow a placement service to be aware of the lineup (and sub-lineup)

topology so that different replicas of the same data are placed on different lineups and/or sub-lineups (e.g., as different power fault domains) to add power diversity for each primary-secondary replica pair. This contrasts with using a single rack as a power fault domain to avoid placing both a primary and secondary copy of the same data (e.g., a volume) on the same rack in the same lineup and/or sub-lineup.

FIG. 1 is a diagram illustrating an environment that enables users of a service provider to configure one or more virtualized computing resource preferences to be used along with power data 115 for a fleet of physical servers 101 to place virtualized computing resources into the fleet of physical servers according to some embodiments. The provider network 100 can be a cloud provider network in some embodiments. A cloud provider network (sometimes referred to simply as a "cloud") may generally refer to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") may generally refer to an isolated failure domain including one or more data center facilities with separate power, separate networking, and separate cooling from those in another availability zone. A data center may generally refer to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service (also referred to in various embodiments as an elastic compute service, virtual machine service, computing cloud service, compute engine, or cloud compute service), data processing service(s) (e.g., map reduce, data flow, and/or other large scale data processing techniques), data storage services (e.g., object storage services, block-based storage services (also referred to in various embodiments as cloud disks, managed disks, storage area network service, persistent disk service, or block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In one embodiment, a user 102 operates an electronic device 104 or configures the electronic device 104 for communications with the provider network 100. The electronic device 104 communicates with the provider network 100 via one or more intermediate networks 106, such as the internet. As described above, a provider network 100 provides users with the ability to use one or more of a variety of types of computing-related resources such as compute resources (for example, executing virtual machines (VMs) and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service that can execute compute instances, a storage service that can store data objects, and so forth. The users (or "customers") of provider networks 100 may utilize one or more user accounts that are associated with a customer account, though these terms may be used somewhat interchangeably depending upon the context of use.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device (e.g., a single physical server). Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

A user can use an interface 108 of the provider network 100 to create and configure at least one fleet 101 of physical servers to support execution of such virtualized computing resources. The physical servers in the fleet 101 of physical servers can be computer systems of various configurations that differ along one or more dimensions, such as number and type of processors, type and amount of memory, connectivity of the memory to the processor(s), number and type of network interfaces, number, and type of local storage devices (e.g., solid-state drives), number and type of hardware accelerators (e.g., graphics processing units), etc. In large-scale networks, there may be hundreds, thousands, or more of physical servers, which may be located in multiple geographic locations.

In FIG. 1, the fleet of physical servers includes a plurality of lineups, e.g., lineup_1 160 to lineup_M 162, where M is any positive integer greater than one. As discussed further below in reference to FIG. 3, each lineup may be individually powered, e.g., by its own connection to a power supply (with the lineup connections to power supply cumulatively referred to as connections 105 in FIG. 1). As depicted, lineup_1 160 includes a plurality of racks, e.g., rack_1 164 to rack_N 166, where N is any positive integer greater than one. Within rack_1 164 is a plurality of physical servers, e.g., physical server_1 150 to physical server_X 152, where X is any positive integer greater than one. The other racks may also include a plurality of physical servers. Each physical server may include one or more instance slots (e.g., shown as a dotted box within a physical server, with examples of instance slot 151 in physical server 150 and instance slot 155 in physical server 154). An instance slot may be used to host a virtual machine instance (e.g., shown as a solid box within a dotted box of an instance slot, with examples of virtual machine instance 153 within instance slot 151 in physical server 150 and virtual machine instance 157 within instance slot 155 in physical server 154). As depicted, lineup_M 162 includes a plurality of racks, e.g., rack_1 168 to rack_Y 170, where Y is any positive integer greater than one. Within rack_1 168 is a plurality of physical servers, e.g., physical server_1 154 to physical server_Z 156, where Z is any positive integer greater than one. The other racks may also include a plurality of physical servers. An instance slot can be considered as a grouping of physical resources on the underlying host (e.g., one or more of CPU, GPU, memory, disk, and networking) that are available to support operations of an instance. Before an instance is placed on a host, the particular resources usable to support the instance may not yet be logically grouped—rather, a placement system can track the remaining capacity on the host in terms of the number of instances that could be supported by free resources. The placement system can track this remaining capacity in terms of available "slots". It should be understood that the number of slots and instances are merely examples. A rack may include a plurality of different physical server (e.g., hardware) types therein.

Power sense circuitry 107 is included to sense the power utilization (e.g., consumption) and create corresponding power data 115 that indicates the power utilization, for example, power utilization on a lineup by lineup granularity and/or a sub-lineup by sub-lineup granularity (e.g., and not power utilization on a rack by rack granularity or physical server by physical server granularity). In certain embodiments, power (e.g., utilization) data 115 is sent to storage, e.g., data store 124. In certain embodiments, power (e.g., utilization) data 115 is real time data, e.g., sent to placement service 114 in real time from power sense circuitry 107. Events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens, e.g., in the context of a system that processes data, these terms may mean processing data as it is received as opposed to storing or persisting the data once received for processing later on.

In one embodiment, the power utilization data is an average power utilization for a particular physical server, rack of physical servers, lineup, and/or sub-lineup of a plurality of racks of physical servers. Additionally or alternatively, the power utilization data is a maximum and/or minimum power utilization for a particular physical server, rack of physical servers, lineup, and/or sub-lineup of a plurality of racks of physical servers. In certain embodiments, the power utilization data is for a particular time period (e.g., per second, per minute, per hour, per day, etc.), for example, the total power utilization for that time period or the average power utilization for that time period per a unit of time. The power supply to power the lineups may be power supplied as alternating current (AC) or direct current (DC). In one embodiment, the power is the real (e.g., active) power, e.g., as measured in units of a watt. In certain embodiments, power data is on a per sub-lineup basis, for example, such that the overall (e.g., average) power for each sub-lineup is individually maintained in power data 115. In certain embodiments, power data is (e.g., also) on a per lineup basis, for example, such that the overall (e.g., average) power for each lineup is individually maintained in power data 115.

Aspects of enabling users to manage virtualized computing resource placement for fleets of physical servers based on power data are described for the provider network 100 with reference to an exemplary set of events and operations, described with references to the triangles labeled "A" through "D" in FIG. 1. Furthermore, the launch of a compute instance within the fleet 101 (specifically, a launch that ultimately places a VM instance onto a physical server based in part on the power data) is described with reference to encircled numbers "1" through "10" of FIG. 1. In this example, a user is requesting to launch a particular type of compute instance, although the processes described herein can be applied to other types of virtualized computing resources (for example, containers, database instances, storage resources, and so forth).

It may be desirable to enable a placement service to launch virtualized computing resources based at least in part on power utilization data for each electrical lineup and/or sub-lineups of a plurality of electrical lineups, for example, in addition to the placement being based on user-specified virtualized computing resource preferences. In one embodiment, for each line, the lineup's utilization is compared with the utilization of its sub-lineups, e.g., and only the largest of them gets passed to the placement service. For example, if lineup 160 is below its power utilization threshold (e.g., 80%), but one (or more) of the sub-lineups 214A-214C are above (or approaching) their power utilization threshold, certain embodiments herein indicate that to the placement service, e.g., by passing data that indicates the sub-lineup is above (or approaching) its power utilization threshold.

Example fleet 101 includes, but is not limited to, a server pool including physical servers 150, 152, 154, and 156. An example state of the physical servers 150, 152, 154, and 156 is as follows: physical server 150 is hosting several VM instances, including VM instance 153 in a VM instance slot 151. Similarly, physical servers 152, 156 and 156 are shown currently hosting other VM instances in VM instance slots, where each server may have some number of unused instance slots representing an amount of unused compute capacity of the server. Note that the fleet 101 may include physical servers with different amounts of capacity, and support for different types and sizes of virtualization computing resources. Further note that VM slots (for example, the VM instance slot 151) illustrated within the physical servers (e.g., electronic devices) 150, 152, 154, and 156 may be logical representations of portions of capacity managed by a control plane 103 of the provider network 100. The physical servers (e.g., electronic devices) 150, 152, 154, and 156 may or may not have a local concept of a slot and execute instances based on received configuration and launch instructions, as described below.

The traffic and operations of the cloud provider network may broadly be subdivided into two categories in various embodiments: control plane operations carried over a logical control plane 103 and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

At the triangle labeled "A", a request that causes power data to be used (or collected) is received. In one embodiment, the request at "A" is a request to power-on the fleet of physical servers 101. In one embodiment, the request at "A" is a request to turn on power aware load placement of virtualized computing resources into the host fleet 101. Upon receiving a request at "A" to turn on power aware load placement of virtualized computing resources, placement service 114 is notified accordingly, in some embodiments, the interface(s) 108 sends one or more messages to the CM frontend 109 which then updates the placement service accordingly, as indicated at the triangle labeled "B." In some embodiments, at the triangle labeled "C," the power sense circuitry 107 receives a message (e.g., from control plane 103) to indicate power data 115 is to be sent (e.g., and to begin collecting that data or send that data where the data collection has already begun) to the placement service 114, as indicated at the triangle labeled "D". In other embodiments, the power data is sent to the CM data store 124 before being send to placement service 114.

In certain embodiments, placement service 114 receives a request to launch a virtualized computing resource at the circle "1", for example, with the request indicating one or more virtualized computing resource preferences. To make a power aware placement decision in one embodiment, placement service 114 accesses power data 115 (e.g., sourced from power sense circuitry 107), and determines a power utilization for each lineup and/or each sub-lineup of a plurality of lineups 160 to 162. In certain embodiments, placement service 114 then selects a physical server from a lineup and/or sub-lineup of the plurality of lineups 160 to 162 at which to launch the virtualized computing resource based on the one or more virtualized computing resource preferences and the power utilizations for the plurality of lineups. For example, it may be determined that lineup_1 160 is approaching (or at) a power utilization threshold (e.g., as in FIG. 3) and that lineup_M 162 is not approaching (or at) a power utilization threshold (e.g., as in FIG. 3) (e.g., the same power utilization threshold of lineup_1 or a different power utilization threshold). The placement service 114 then causes a physical server on lineup_M 162 to execute the virtualized computing resource (e.g., to cause VM instance 157 to be placed into previously empty slot 155) in certain embodiments. For example, it may be determined that a sub-lineup of lineup_1 160 is approaching (or at) a power utilization threshold (e.g., as in FIG. 3) and that a sub-lineup of lineup_M 162 is not approaching (or at) a power utilization threshold (e.g., as in FIG. 3) (e.g., the same power utilization threshold of lineup_1 or a different power utilization threshold). The placement service 114 then causes a physical server on that sub-lineup of lineup_M 162 (e.g., sub-lineup 214D in FIG. 2C) to execute the virtualized computing resource (e.g., to cause VM instance 157 to be placed into previously empty slot 155) in certain embodiments.

In certain embodiment, a circuit breaker sends its circuit breaker rating to placement service 114, e.g., in response to a request sent by placement service 114. In certain embodiments, placement service 114 determines a circuit breaker rating from a lineup topology, e.g., a topology that indicates the circuit breaker ratings and the physical servers of each lineup and each sub-lineup (e.g., as a file stored in data store 124).

The virtualized computing resource being requested for provisioning may be a virtual machine instance. The cloud provider network may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance families. An instance family may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance family can have a specific ratio of processing, local storage, memory, and networking resources, and different instance families may have differing types of these resources as well. Multiple sizes of these resource configurations can be available within a given instance family, referred to as "instance types." Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In certain embodiments, placement service 114 receives a request to launch a virtual machine instance at the circle "1", for example, with the request indicating a user-specified preference of an instance type of the virtual machine instance. To make a power aware placement decision in one embodiment, placement service 114 accesses power data 115 (e.g., sourced from power sense circuitry 107), and determines a power utilization for each lineup and/or sub-lineup of a plurality of lineups 160 to 162. In certain embodiments, placement service 114 then selects a lineup and/or a sub-lineup of that lineup of the plurality of lineups for the virtual machine instance based on the power utilizations for the plurality of lineups and/or their sub-lineups. In one embodiment, placement service 114 then selects a virtual machine slot for the virtual machine instance from a plurality of candidate virtual machine slots of the physical servers of the lineup and/or its sub-lineup(s) of the plurality of lineups based on the user-specified preference. The placement service 114 then causes the virtual machine slot of a physical server of the lineup and/or sub-lineup to execute the virtual machine instance in certain embodiments.

In one embodiment, the sub-lineup is selected such that the selected sub-lineup does not approach and does not exceed a power utilization threshold of the sub-lineup(s) (or the plurality of lineups). In one embodiment, the lineup is selected such that the selected lineup does not approach and does not exceed a power utilization threshold of the lineup (or the plurality of lineups). In one embodiment, the power utilization threshold of the plurality of lineups and/or sub-lineups is changed to a different power utilization threshold, e.g., via interface 108. The change request may be only accessible to a service provider, e.g., and not their users (e.g., "customers"). The power utilization threshold may be indicated by a percentage of the overall power. The power utilization threshold may be any number, for example, about 50%, 60, 70%, 80%, 90%, 95%, 99%, etc. The power utilization threshold may be adjustable, for example, by (e.g., a service provider via interface 108) saving a corresponding value into data store 124 to indicate (e.g., modify) the power utilization threshold (e.g., power utilization threshold 320 in FIG. 3).

In one embodiment, the lineups and/or sub-lineups (e.g., and thus the physical server(s) thereof) used to service a request for a virtualized computing resource are selected to equalize power utilization of each lineup and/or sub-lineup of the plurality of lineups based on the power utilizations from power data 115. However, in one embodiment, the selecting of physical servers on different lineups and/or sub-lineups to equalize power utilization is overridden to instead select physical servers on a single lineup (e.g., for latency purposes). In one embodiment, the selecting of physical servers on different lineups and/or sub-lineups to equalize power utilization of each lineup and/or sub-lineup of the plurality of lineups based on the power utilizations is overridden to select physical servers on a single lineup (or sub-lineup) of the plurality of lineups at which to launch the virtualized computing resources (e.g., for the reasons discussed herein).

Figure 2A:
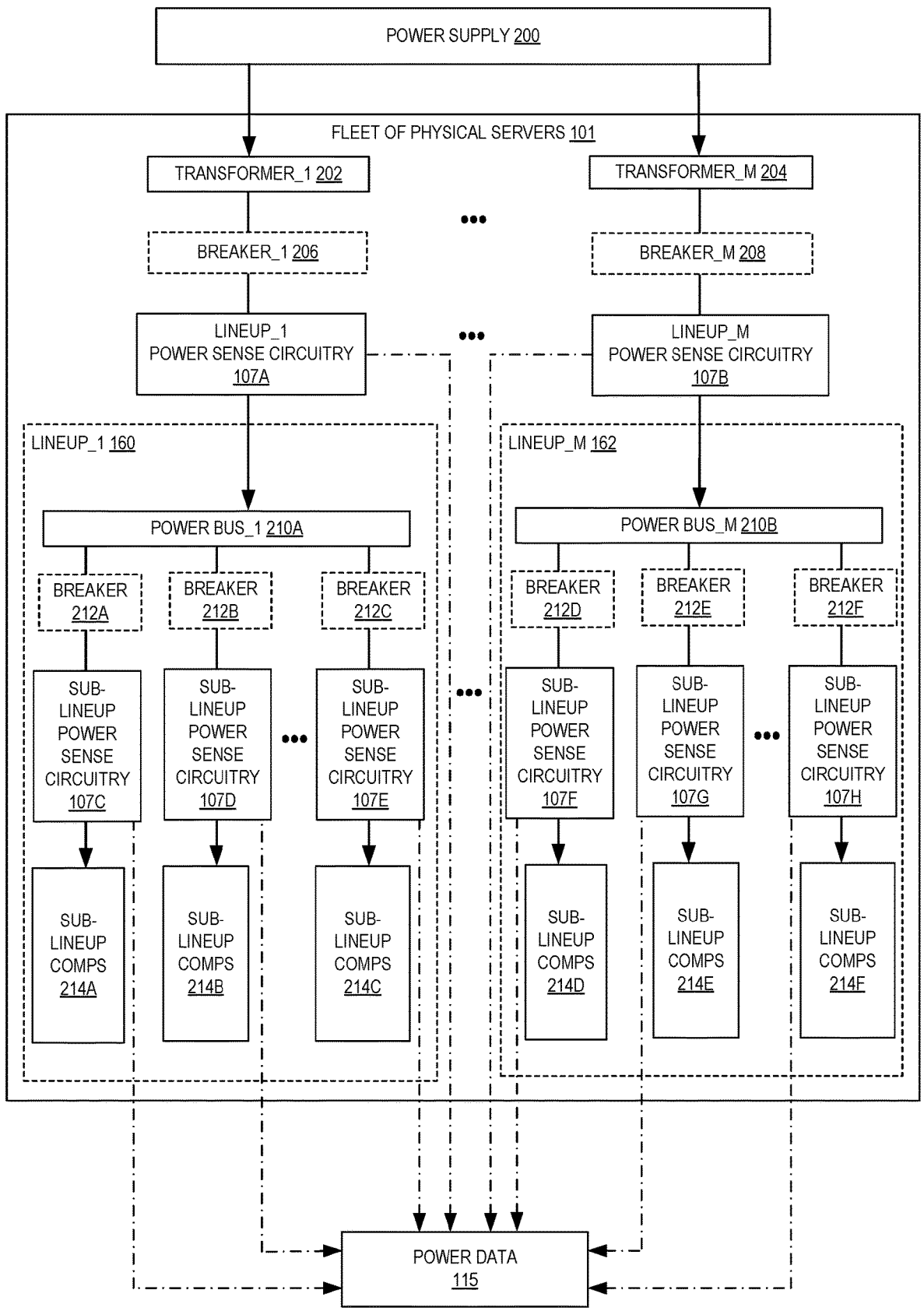
FIG. 2A is a diagram illustrating a power topology for a fleet of physical servers according to some embodiments.
Figure 2B:
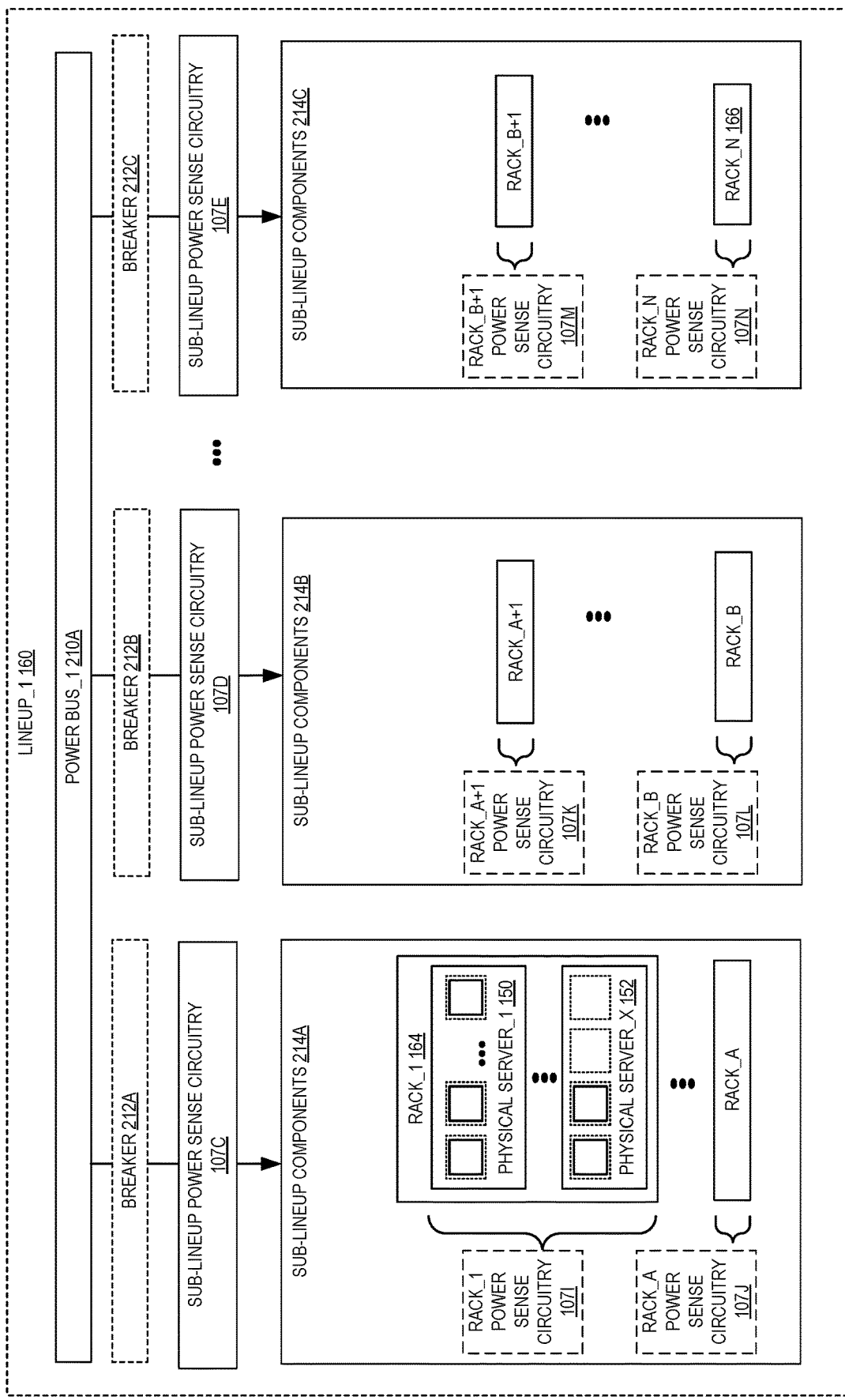
FIG. 2B is a diagram illustrating a power topology for first lineup according to some embodiments.
Figure 2C:
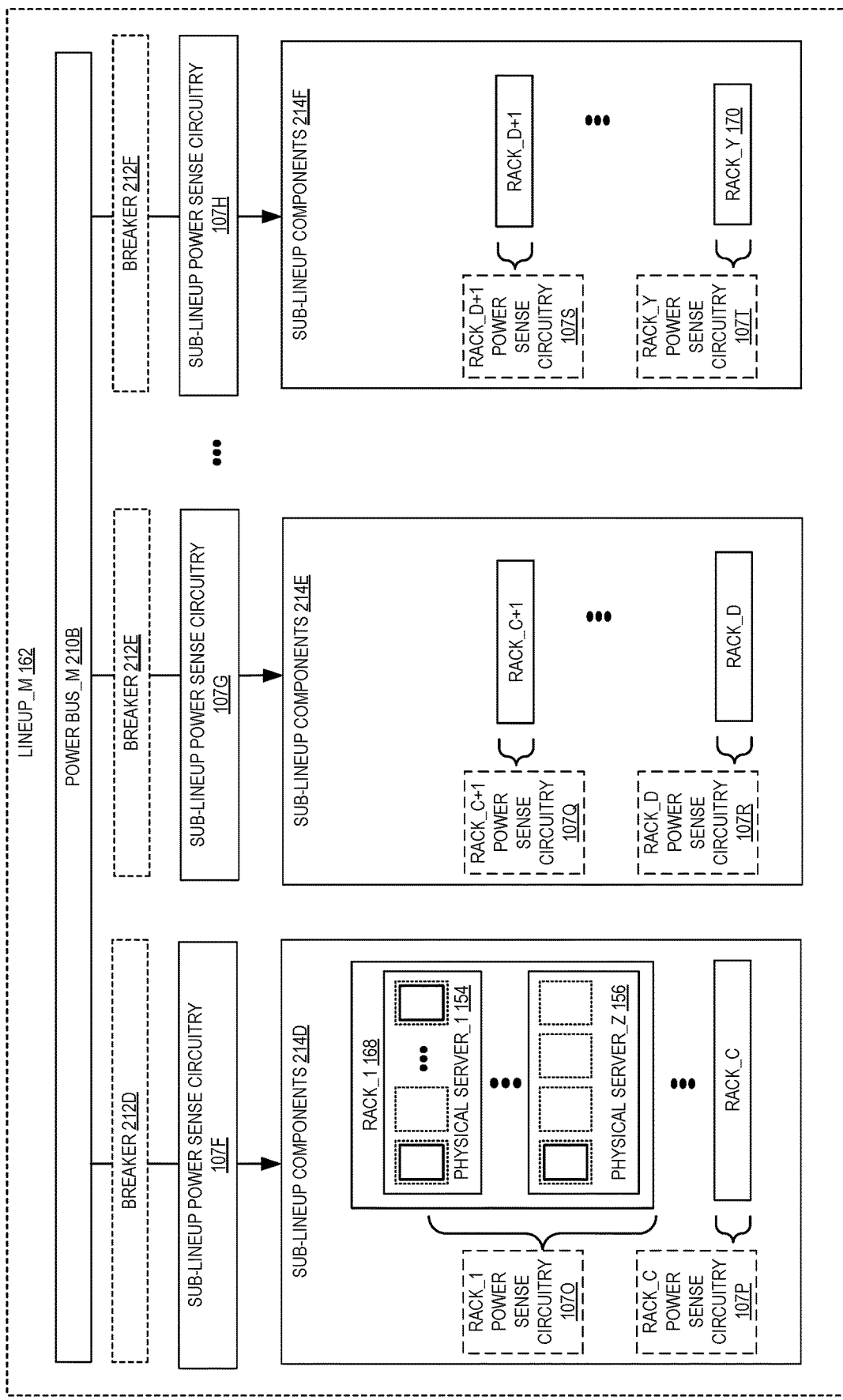
FIG. 2C is a diagram illustrating a power topology for another lineup according to some embodiments.

As discussed further in reference to FIGS. 2A-2C, each lineup may be coupled to a respective power supply line, e.g., to independently provide power to each lineup. In one embodiment, each lineup is coupled to a respective power transformer of a plurality of power transformers, for example, to independently provide power independent of a circuit breaker of another lineup tripping (or otherwise power failing to another lineup). In one embodiment, each sub-lineup has its own circuit breaker to independently provide power independent of a circuit breaker of another sub-lineup of the same lineup tripping (or otherwise power failing to another sub-lineup of the same lineup).

In certain embodiments, the determining (e.g., by the placement service 114) of the power utilization of each lineup includes determining an average power utilized by each lineup for a time period. Additionally or alternatively, in certain embodiments, the determining (e.g., by the placement service 114) of the power utilization of each sub-lineup includes determining an average power utilized by each sub-lineup for a time period. In one embodiment, the selecting (e.g., by the placement service 114) of the lineup and/or sub-lineup to use for the virtualized computing resource comprises selecting the lineup and/or sub-lineup having a power utilization not exceeding a power utilization threshold (e.g., threshold 320 in FIG. 3) of the plurality of lineups and/or sub-lineups. In one embodiment, the selecting (e.g., by the placement service 114) of the lineup and/or sub-lineup to use for the virtualized computing resource comprises selecting the lineup and/or sub-lineup having the lowest power utilization of the power utilizations of the plurality of lineups and/or sub-lineups.

Certain embodiments herein (e.g., of a placement service) are used to move virtualized computing resource(s) (e.g., virtual machine instance(s)) at certain time period(s) (e.g., as set by a user) in contrast to a virtualized computing resource being placed only for a request to launch the virtualized computing resource. For example, a placement service may (e.g., repeatedly) balance the power utilization in each lineup and/or sub-lineup, e.g., as the power utilization(s) may change after an initial launch of virtualized computing resource(s). For example, the disclosed techniques for balancing usage of power lineups and/or sub-lineups in a data center can be used for migration as well as initial resource launches. Migration may generally refer to moving virtual machine instances (and/or other resources) between hosts in a cloud computing network, or between hosts outside of the cloud computing network and hosts within the cloud. There are different types of migration including live migration and reboot migration. Techniques for various types of migration involve managing the critical phase—the time when the virtual machine instance is unavailable to the customer—which should be kept as short as possible. Here, resource(s) can be migrated away from "hot" lineups and/or sub-lineups to "cool" lineups in order to achieve a more even load on the power lineups and/or sub-lineups.

During an embodiment of a reboot migration, the customer experiences an outage and an effective power cycle of their virtual machine instance. For example, a control plane service can coordinate a reboot migration workflow that involves tearing down the current domain on the original host (the "source host") and subsequently creating a new domain for the virtual machine instance on the new host (the "target host"). In certain embodiments, the instance is rebooted by being shut down on the original host and booted up again on the new host.

Live migration may generally refer to the process of moving a running virtual machine instance between different physical machines without significantly disrupting the availability of the virtual machine instance (e.g., the down time of the virtual machine instance is not noticeable by the end user). When the control plane initiates a live migration workflow it can cause the creation of a new "inactive" domain associated with the instance on a target host, while the original domain for the instance continues to run as the "active" domain on the source host. Memory (including any in-memory state of running applications), storage, and network connectivity of the virtual machine are transferred from the original host with the active domain to the destination host with the inactive domain. For example, a local migration manager running on the source can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded.

The methods herein may be repeated for additional requests.

Power data 115 may include a lineup (and sub-lineup) topology that indicates the physical servers of each lineup and/or sub-lineup of the plurality of lineups, for example, indicating the physical servers that are in lineup_1 160 (e.g., and its plurality of sub-lineups) and the physical servers that are in lineup_M 162 (e.g., and its plurality of sub-lineups). The lineup topology may be used by placement service 114 to place a first replica of a dataset on one or more physical servers of a first lineup and/or sub-lineup of the plurality of lineups, and to place a second replica of the dataset on one or more physical servers of a second lineup and/or sub-lineup of the plurality of lineups based on the lineup topology. Power data 115 may be the ratio of the power utilization to (e.g., divided by) the corresponding power utilization threshold (e.g., rating).

Placement service 114 may thus indicate a placement preference (e.g., a request to launch a virtualized computing resource) on a particular lineup and/or sub-lineup. This placement preference may be in addition to other request(s), for example, a request by the user for preferences for the virtualized computing resources.

At the circle labeled "1", a user sends one or more messages that indicate one or more virtualized computing resource preferences for one or more virtualized computing resources to be placed with the fleet 101 of physical servers. Communications between the electronic device 104 and the provider network 100, such as the request specifying the one or more virtualized computing resource preferences, can be routed through interface(s) 108, such as through use of application programming interface (API) calls, via a console implemented as a website or application, and so forth. An API may generally refer to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 108 may be part of, or serve as a frontend to, a control plane 103 of the provider network 100 that includes "backend" services supporting and enabling the services that may be more directly offered to customers, such as services that enable the ability of users to configure virtualized computing resource preferences and to launch instances within the fleet 101. In addition to serving as a frontend to control plane services, the interface(s) 108 can perform operations such as verifying the identity and permissions of the user initiating a request, evaluating the request and routing it to the appropriate control plane services, and so forth.

As indicated above, in general, the virtualized computing resource preferences (which may include one or more placement preferences) specified by a user generally provide an indication of what virtualized computing resources are to be used, and thus indicate which type of hardware (e.g., particular physical servers) are to be used in response to requests to launch the resources. Additionally or alternatively, a user may indicate a preference that that VM instances requiring a particular type of server-bound software license to be clustered together on as few physical servers as possible within the user's fleet (for example, to minimize license costs), a preference that particular types of VM instances are clustered together for low-latency and other performance reasons, or a preference that other types of VM instances are spread across physical servers for redundancy purposes, or other types of preferences or combinations thereof.

In some embodiments, a provider network 100 provides one or more graphical user interface (GUIs) that enable users to specify the various types of user-configurable virtualized computing resource preferences to be applied to the user's launch requests. For example, a GUI can include interface elements enabling a user to indicate what types of preferences are desired by the user, to specify weightings to be associated with one or more of the virtualized computing resource preferences (for example, using slider bars or other input mechanisms), to specify tags or other metadata associated with instance launches used to determine which virtualized computing resource preferences to apply for each launch, and so forth. In some embodiments, users may also provide input specifying custom code or other logic that the user has created to be executed as part of certain virtualized computing resource determinations. For example, a user can upload a script or other executable logic that can be used to generate a virtualized computing resource determination based on input indicating launch request properties and current system conditions, or a user may create code to be executed by another service of the provider network 100 that is invoked as part of the placement determination and that returns an indication of preferred servers within a fleet for launching resources, and so forth. In some embodiments, a GUI can display data reflecting one or more historical placement determinations made by the service provider based on a user's provided virtualized computing resource preferences.

In some embodiments, users can update virtualized computing resource preferences over time, for example, in response to changing performance needs, system conditions, or other reasons. A user, for example, can use a GUI as described above to select a previously defined set of virtualized computing resource preferences, provide additional input specifying one or more modifications to the existing virtualized computing resource preferences (for example, by modifying associated weights, relative priorities, and so forth), remove or add virtualized computing resource preferences, or make other changes that can be saved as an updated set of virtualized computing resource preferences. In some embodiments, a set of defined virtualized computing resource preferences can be copied and applied to one or more other physical server pools or fleets of physical servers associated with a same or different user of a provider network 100.

As indicated above, aspects of launching a virtualized computing resource are described for the provider network 100, with reference to an exemplary set of events and operations associated with the launch of a VM instance within the fleet 101, with reference to encircled numbers "1" through "10" of FIG. 1. At circle "1," the user uses an electronic device 104 to send one or more messages to the provider network 100 to request the launch of one or more instances. In the illustrated embodiment, a "launch path" includes the interface(s) 108, the CM frontend 109, the CM backend 112, and an instance configuration service (ICS) 116 (where some or all of these components may form at least a portion of a hardware virtualization service, in some embodiments). Each service in the launch path may receive one or messages from one or more upstream entities (for example, the CM frontend 109 receives messages from the interface(s) 108, the interface(s) 108 receive messages from the electronic device 104, and so forth), perform one or more operations (for example, collecting or validating information), and send one or more messages to a downstream entity (for example, the CM frontend 109 sends messages to the CM backend 112). The various components of the control plane 103 may be a set of distributed services or applications that facilitate operations as described herein. Other embodiments may combine or divide one or more of the control plane services (for example, combining the CM frontend 109 and CM backend 112, splitting out functionality of a service, and so forth).

In this example, the request to launch one or more virtualized computing resources is a request to launch one or more VM instances into the fleet of physical servers 101, and the placement service 114 corresponds to a virtual compute service. However, in other implementations, similar power-balancing techniques can be used for placement of other resources, such as block storage volumes. It will be appreciated that different services of the cloud provider network may have differing control plane architectures from the example shown, while still using a placement service as described herein. The one or more messages sent by the electronic device 104 may identify launch properties associated with each requested instance (for example, a number of CPU cores for each instance, amount of memory for each instance, and so forth) or may provide an identification of an instance type for each requested instance that identifies the one or more launch properties to the control plane.

In some embodiments, the launch properties associated with the request can further include "tag" information or other metadata identifying other various properties of the request. For example, one or more tags associated with a launch request can identify a type of resource being launched (for example, to identify an instance as a frontend application or a backend database service of a larger application system). An identification of a type of instance being launched can be associated with other placement preferences (e.g., not based on power data) indicating a desire to cluster certain types of instances for latency purposes, or to spread other types of instances for redundancy purposes (for example, a set of database instances may be clustered with one or more other types of instances for low-latency, except for certain database instances tagged as "backups," which may be spread for redundancy purposes).

In some embodiments, launch properties can additionally or alternatively include information automatically derived from a machine image or other attribute of the request. For example, information such as an associated operating system, user applications, associated software licenses, and other instance properties may be automatically derived from a launch request or data associated with a launch request in some examples.

Upon receiving a message to launch an instance, the interface(s) 108 sends one or more messages to the CM frontend 109, as indicated at circle "2." The messages can include information identifying the requesting user and further identifying the type or parameters of the requested instance. As indicated above, in some embodiments, the CM frontend 109 offloads a portion of the operations associated with managing the provider network from the CM backend 112 to reduce the workload of the CM backend 112. In some embodiments, the CM backend 112 may be the only service able to write to the CM data store 124, which can serve as a single source of truth of the state of the provider network 100, and thus subject to a demanding workload. One such offloaded operation is verifying that the request to launch an instance can proceed along the launch path by checking with a policy enforcement service (PES) 110, as indicated at circle "3."

The PES 110 evaluates a launch request against one or more policies to determine whether the launch can proceed. Exemplary policies include checking the requesting user's creditworthiness, whether the user has any limits imposed on the number of instances they can launch, and whether the request might lead to resource shortages within the fleet 101. In the latter case, the PES 110 fetches capacity information from the capacity tracker service (CTS) 111, as indicated at circle "4." In some embodiments, the capacity information includes a number of available slots in a given fleet 101 or server pool (for example, the total number of available VM slots in each lineup and/or its sub-lineups in the fleet 101) and a threshold at which the PES 110 should begin to limit the number of requests that are admitted. The PES 110 evaluates the launch request against the capacity information and, in some cases, may reject a launch request. In certain cases where the PES 110 rejects a request for capacity or other reasons, the CM frontend 109 and/or interface(s) 108 is to provide an indication of the reason for failure to the customer. Otherwise, the PES 110 allows the launch request.

Assuming the PES 110 allows the request, at circle "5," the CM frontend 109 sends one or more messages to the CM backend 112 to continue the launch process associated with the VM instance request. The CM backend 112 may be responsible for updating a CM data store 124 that contains a state of the fleet 101 (for example, including state indicating available instance slots on each physical server, which instances are on which physical servers, the configurations of those instances, and so forth). Prior to being able to satisfy the launch request and update the state of the fleet 101, the CM backend 112 determines where within the fleet 101 to launch the requested instance. To make this placement determination, at circle "6," the CM backend 112 sends one or more messages to the placement service 114 to obtain placement information.

In certain embodiments, the placement service 114 evaluates the power data 115, state of the fleet 101, the one or more launch properties associated with the launch, and any user-specified preferences to determine where to launch an instance. The fleet 101 may include numerous physical servers, each with varying properties and amounts of available capacity. As described in greater detail with reference to FIG. 3, the placement service 114 identifies a location for the requested instance by evaluating these various parameters. Upon making a placement determination, the placement service 114 returns placement information to the CM backend 112. Such placement information can include an identifier of the physical server within a lineup and/or sub-lineup of fleet on which to launch the instance, and a slot identifier to logically track the usage of those resources within the fleet 101. In some embodiments, the placement service 114 also sends updated capacity usage information to the CTS 111, as indicated at circle "7," so that the CTS 111 can update its capacity information.

Note that in situations where a user has requested the launch of more than one instance and that request has proceeded to the CM backend 112, the CM backend 112 may serialize placement requests to the placement service 114 or the placement service 114 may serialize a received batch placement request from the CM backend 112.

For one example of the VM instance request in FIG. 1, the placement service 114 returns an identifier of lineup 160, and more particularly, physical server 150 (e.g., of sub-lineup 214A in FIG. 2B) and an identifier of slot 151 to the CM backend 112, where slot 151 is not occupied by an instance prior to the launch request. At circle "8," the CM backend 112 updates the CM data store 124 to indicate the instance will be launched on physical server 150 in lineup 160. After updating the CM data store 124 to indicate that the instance will be launched on the physical server 150, the CM backend 112 sends one or more messages to the instance configuration service (ICS) 116 to configure and launch the instance, as indicated at circle "9."

The ICS 116 receives the instruction from the CM backend 112 to configure and launch an instance. The ICS 116 performs a workflow to configure and launch an instance according to one or more parameters, such as the compute, memory, network, storage, or other configuration settings. Those parameters may be received from the CM backend 112 or fetched based on one or more received identifiers that locate the parameters within the CM data store 124. The ICS 116 communicates with the physical server of the fleet 101 designated to host the instance, as indicated at circle "10," sending one or more messages to configure and launch the instance. For example, in some embodiments the ICS 116 may cause an offload card (which may include one or more processors, a local memory, physical network interfaces, and so forth) that is a part of (that is, coupled with) an electronic device of the fleet 101 to launch the compute instances. The offload card may implement a virtualization manager that can manage, for example, virtual machine compute instances that execute on a host electronic device, independent of a hypervisor or in combination with a hypervisor that executes using the traditional CPU(s) of the electronic device. For example, in some embodiments, the virtualization manager implemented by the offload card can instantiate and/or terminate virtual machines, thus eliminating the need for the hypervisor to perform these tasks, which can improve the performance of the virtual machines themselves due to not having to compete for resources with the hypervisor.

Alternatively, in some embodiments, the ICS 116 interacts with a hypervisor (for example, via a VM management server) to cause the compute instance(s) to be launched. In either case, the ICS 116 causes the physical server to create a virtual machine or other environment with the requested hardware configuration (for example, with access to a local solid-state drive, with two network interfaces, access to a local graphics accelerator, four cores, and 8 gigabytes of memory) and software configuration (executing a machine image that includes a Linux or other operating system, and so forth). Continuing the launch example in FIG. 1, the ICS 116 causes a VM instance 153 to be launched on physical server 150.

Note that the environment illustrated in FIG. 1 shows one exemplary configuration of a launch path and associated control plane services. Other launch paths and control plane service configurations are possible. For example, the CM frontend 109 may request placement information from the placement service 114 and pass the obtained placement information to the CM backend 112, the CM frontend 109 and CM backend 112 can be combined, the placement service 114 and CTS 111 may access read replicas of the CM data store 124 rather than the same data store than the CM backend 112 is writing to, the CM backend 112 may make placement determinations in place of the placement service 114, and so forth. By enabling the placement service to have access to power data 115, the provider network 100 is able to make power as an influencer of decisions for the placement of instances into dedicated fleets of physical servers to help maintain a more uniform power load distribution, among other benefits.

FIG. 2A is a diagram illustrating a power topology for a fleet of physical servers 101 according to some embodiments.

Each lineup may include its own connection to a power supply, for example, its own transformer, circuit breaker, etc. In FIG. 2A, lineup_1 160 includes transformer 202 coupled to a first output of power supply 200 and transformer 202 coupled to a second output of power supply 200. In one embodiment, transformer 202 converts the voltage from a respective output of the power supply 200 (e.g., about 34,500 volts) to a lower voltage (e.g., about 480 volts), e.g., the voltage for consumption by lineup_1 160, and transformer 204 converts the voltage from a respective output of the power supply 200 (e.g., about 34,500 volts) to a lower voltage (e.g., about 480 volts), e.g., the voltage for consumption by lineup_1 162. In one embodiment, each lineup has a maximum power consumption (e.g., about 2 megawatts (MW)). It should be understood that a rack and/or physical server may also include one or more transformers to transform the voltage to a lower voltage (e.g., about 120 volts or about 240 volts). In one embodiment, power supply 200 provides the power to one or more (e.g., all) lineups in fleet 101. Power supply (e.g., uninterruptible power supply having emergency power) may be a utility substation.

In FIG. 2A, lineup 160 (and thus the racks of physical servers therein) is coupled (e.g., downstream from transformer 202) to power sense circuitry 107A to determine the power utilization for lineup 160, and lineup 162 (and thus the racks of physical servers therein) is coupled (e.g., downstream from transformer 204) to power sense circuitry 107B to determine the power utilization for lineup 162. Power sense circuitry may thus send power utilization for each lineup as power data 115 (e.g., for storage in data store 124 in FIG. 1). In one embodiment, power data 115 is stored in fleet 101, e.g., and read by placement service 114 in FIG. 1.

A circuit breaker may be included between each lineup and its power supply, for example, circuit breaker_1 206 for the power supply line for lineup 160 and circuit breaker_M 208 for the power supply line for lineup 162. In one embodiment, each circuit breaker is selected so as to switch open (e.g., not allow power to flow) to prevent an overload (or short circuit) of power (e.g., current) for a lineup, e.g., to prevent exceeding the maximum power that is safely supplied by the transformer that the circuit breaker sources its power from. Each lineup circuit breaker may have its own rating, for example, current (e.g., ampere) rating.

Each lineup may be divided into a proper subset of components (e.g., sub-lineups). For example, with each sub-lineup powered by a power bus, e.g., sub-lineups 214A, 214B, and 214C powered by power bus 210A and sub-lineups 214D, 214E, and 214F powered by power bus 210B. Although three sub-lineups are shown for each lineup, it should be understood that other number(s) of sub-lineups may be utilized.

In certain embodiments, power sense circuitry is included at a per sub-lineup granularity, e.g., power sense circuitry 107C to sense the power utilization for sub-lineup 214A (e.g., components thereof), power sense circuitry 107D to sense the power utilization for sub-lineup 214B (e.g., components thereof), power sense circuitry 107E to sense the power utilization for sub-lineup 214C (e.g., components thereof), power sense circuitry 107F to sense the power utilization for sub-lineup 214D (e.g., components thereof), power sense circuitry 107G to sense the power utilization for sub-lineup 214E (e.g., components thereof), and power sense circuitry 107H to sense the power utilization for sub-lineup 214F (e.g., components thereof). Shown as sub-lineups 214A, 214B, and 214C cumulatively forming lineup 160 and sub-lineups 214D, 214E, and 214F cumulatively forming lineup 162. The power utilization data from power sense circuitry 107C-H may be sent as power data 115.

A circuit breaker may be included between each sub-lineup and its lineups' power supply (e.g., and its lineup level circuit breaker), for example, circuit breaker 212A for the power supply line for sub-lineup 214A, circuit breaker 212B for the power supply line for sub-lineup 214B, circuit breaker 212C for the power supply line for sub-lineup 214C, with breakers 212A-212C cumulatively receiving their power from breaker 206 in certain embodiments, and circuit breaker 212D for the power supply line for sub-lineup 214D, circuit breaker 212E for the power supply line for sub-lineup 214E, and circuit breaker 212F for the power supply line for sub-lineup 214F, with breakers 212D-212F cumulatively receiving their power from breaker 208 in certain embodiments. In one embodiment, each circuit breaker is selected so as to switch open (e.g., not allow power to flow) to prevent an overload (or short circuit) of power (e.g., current) for a sub-lineup, e.g., to prevent exceeding the maximum power that is safely supplied. Each sub-lineup circuit breaker may have its own rating, for example, current (e.g., ampere) rating. For example, with lineup's breaker having a different (e.g., higher) rating than its sub-lineup(s) breaker(s).

In certain embodiments, a circuit breaker is a Long Time Short Time Instantaneous (LSI) breaker that supports a combination of adjustable trip functions, e.g., long-time ampere rating, long-time delay, short-time pickup, short-time delay, and/or defeatable instantaneous pickup. In certain embodiments, a circuit breaker is a Long Time Short Time Instantaneous and Ground-fault (LSIG) breaker that supports a combination of adjustable trip functions, e.g., including long-time ampere rating, long-time delay, short-time pickup, short-time delay, defeatable instantaneous pickup, ground-fault pickup, and/or ground-fault delay.

FIG. 2B is a diagram illustrating a power topology for first lineup 160 according to some embodiments. As depicted in FIG. 2B, lineup 160 has a plurality of sub-lineups, e.g., depicted as three sub-lineups 214A, 214B, and 214C. In certain embodiments, each lineup includes a plurality of components, e.g., racks of physical servers. As depicted, sub-lineup 214A includes rack_1 164 through rack A (e.g., where A is any integer), sub-lineup 214B includes rack A+1 through rack B (e.g., where B is any integer), and sub-lineup 214C includes rack B+1 through rack N 166 (e.g., where N is any integer). Each rack includes a plurality of physical servers in certain embodiments, e.g., rack_1 164 including physical server_1 150 to physical server_X 152 (e.g., where X is any integer greater than one). In certain embodiments, power sense circuitry is included (or not included) at a per rack granularity, e.g., power sense circuitry 107I to sense the power utilization for rack 164, power sense circuitry 107J to sense the power utilization for rack A, power sense circuitry 107K to sense the power utilization for rack A+1, power sense circuitry 107L to sense the power utilization for rack B, power sense circuitry 107M to sense the power utilization for rack B+1, and power sense circuitry 107N to sense the power utilization for rack N 166. The power utilization data from power sense circuitry 107C-107E (and/or 107I to 107N) may be sent as power data 115. In certain embodiments, power utilization data from one or more of power sense circuitry 107C-E (and/or 107I to 107N) is used by a placement service, e.g., to maintain a desired power utilization in each rack.

FIG. 2C is a diagram illustrating a power topology for another lineup 162 according to some embodiments. As depicted in FIG. 2B, lineup 162 has a plurality of sub-lineups, e.g., depicted as three sub-lineups 214D, 214E, and 214F. In certain embodiments, each lineup includes a plurality of components, e.g., racks of physical servers. As depicted, sub-lineup 214D includes rack_1 168 through rack C (e.g., where C is any integer), sub-lineup 214E includes rack C+1 through rack D (e.g., where D is any integer), and sub-lineup 214F includes rack D+1 through rack Y 170 (e.g., where Y is any integer). Each rack includes a plurality of physical servers in certain embodiments, e.g., rack_1 168 including physical server_1 154 to physical server_Z 156 (e.g., where Z is any integer greater than one). In certain embodiments, power sense circuitry is included (or not included) at a per rack granularity, e.g., power sense circuitry 107O to sense the power utilization for rack 168, power sense circuitry 107P to sense the power utilization for rack C, power sense circuitry 107Q to sense the power utilization for rack C+1, power sense circuitry 107R to sense the power utilization for rack D, power sense circuitry 107S to sense the power utilization for rack D+1, and power sense circuitry 107T to sense the power utilization for rack Y 170. The power utilization data from power sense circuitry 107F-107H (and/or 107O to 107T) may be sent as power data 115. In certain embodiments, power utilization data from one or more of power sense circuitry 107F-H (and/or 107O to 107T) is used by a placement service, e.g., to maintain a desired power utilization in each rack.

In certain embodiments, the power utilization is normalized according to the number of racks (or the number of physical servers) per lineup and/or sub-lineup. For example, a first lineup may have a first plurality of racks of physical servers and a second lineup may have a second, different plurality of racks of physical servers; and the power utilized by each lineup may be divided by the number of racks (or the number of physical servers) in that respective lineup. For example, a first sub-lineup may have a first plurality of racks of physical servers and a second sub-lineup may have a second, different plurality of racks of physical servers; and the power utilized by each sub-lineup may be divided by the number of racks (or the number of physical servers) in that respective sub-lineup. The normalized power utilization(s) may be used by a placement service, for example, to maintain a desired, normalized power utilization in each lineup and/or sub-lineup (e.g., as normalized power data 115 input into ranker 314 in FIG. 3).

Figure 3:
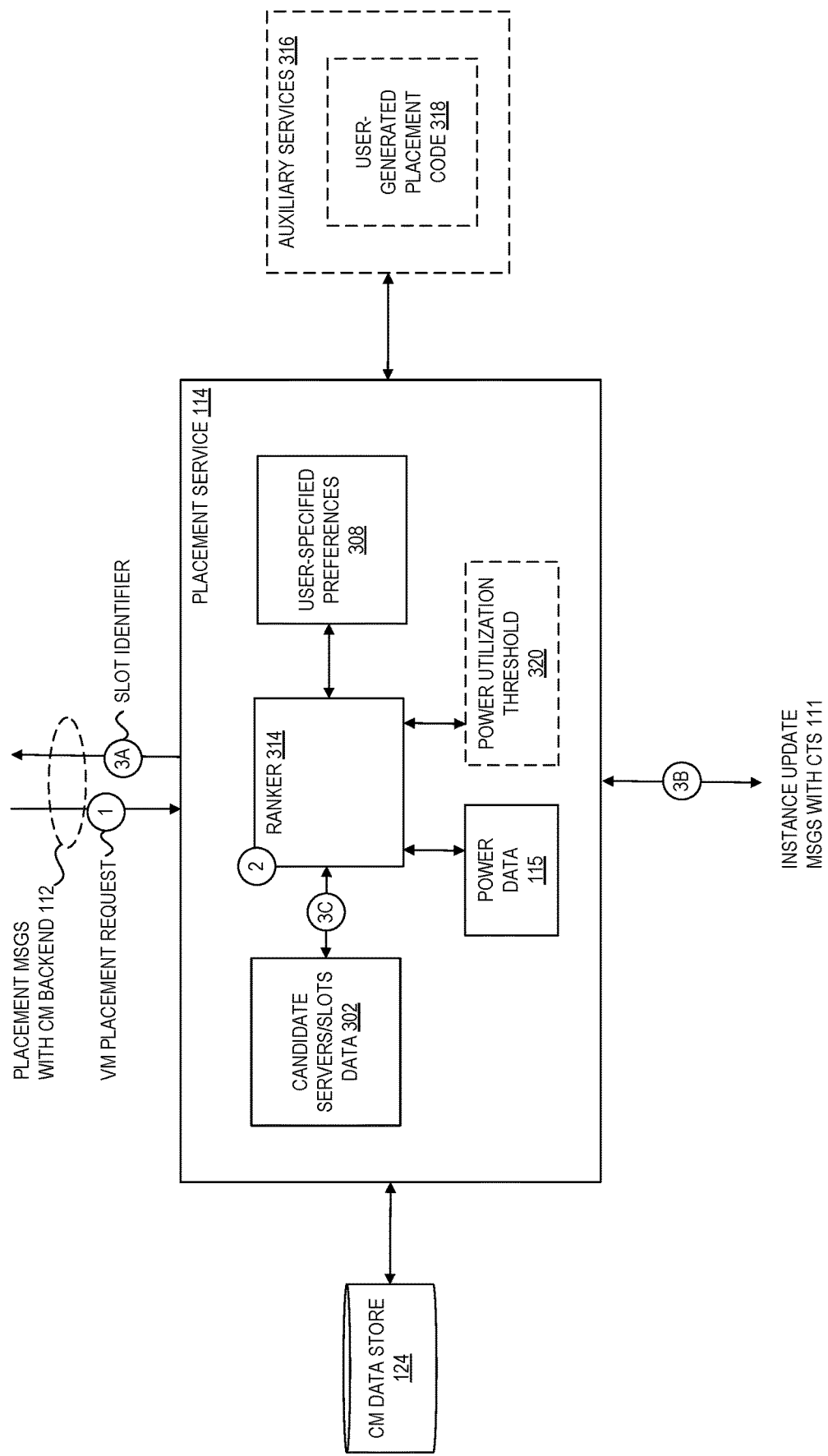
FIG. 3 is a diagram illustrating exemplary components and operations of a placement service and exemplary data that can be used as part of a power aware placement process in a provider network according to some embodiments.

FIG. 3 is a diagram illustrating exemplary components and operations of a placement service and exemplary data that can be used as part of a power aware placement process in a provider network according to some embodiments.

At a high level, the placement service 114 tracks the availability of slots at host instances and selects a slot in response to placement requests according to power data 115, internal placement rules as well as any other (e.g., user-specified) placement preferences. As shown, the placement service 114 includes power data 115, candidate servers/slots data 302, a ranker 314, and user-specified preferences 308, which may be embodied as a set of instructions that are part of an application, service, or component, distributed or otherwise, of the placement service 114. An exemplary set of events and operations associated with the placement service 114 is described with reference to the encircled numbers "1" through "3" of FIG. 3.

To facilitate the selection of a slot to host an instance, candidate servers/slots data 302 is maintained and identifies available slots for hosting instances, as well as various property information associated with each server and/or slot. For example, the property information can indicate resource information about each server, information about software licenses currently associated with various servers, property information associated with instances currently hosted by each server, and so forth. As described below, a ranker 314 evaluates the candidate servers/slots data in response to placement requests according to power data 115 and placement preferences 308.

In some embodiments, the candidate servers/slots data 302 identifies potential slots in part using a resource vector that identifies a set of resources in an instance-hosting physical server. An exemplary resource vector may represent compute and memory in a format <number of cores, amount of memory>. For example, assuming a slot on a physical server is allotted four-core processors and 8 gigabytes (GB) of memory, this capacity may be represented as <4, 8>. Note that the resource vector may extend to any number of dimensions. For example, if an instance-hosting electronic device includes one accelerator and two local disks, a resource vector in the form of <number of cores, amount of memory, accelerators, disks> may be <4, 8, 1, 2>. Other components may also rely on a resource vector as a data structure to exchange or obtain information about an instance. With reference to FIG. 1, the interface(s) 108 may translate a customer request for an instance into a resource vector that is passed down or referenced by other entities in the control plane 103, for example.

At circle "1," the placement service receives a placement request from the CM backend 112. In this example, the request is for a VM instance and is associated with one or more launch properties (e.g., user-specified preferences 308). In response to the request, the ranker 314 selects a slot from the candidate servers/slots data 302, as indicated at circle "2." The ranker 314 applies power data 115 (e.g., and power utilization threshold 320) and one or more user-specified preferences 308 (e.g., instance type) to select a slot from the candidate servers/slots data 302 within the fleet of servers into which the instance is being launched. In one embodiment, ranker 314 filters and/or scores candidate slots based at least in part on the power data 115 and the user-specified preferences 308 to select a slot to satisfy the request. As indicated above, the filtering and/or scoring of candidate slots based on power data and user-specified preferences can include, but is not limited to, filtering and/or scoring candidate slots based on the power utilization of the lineup and/or sub-lineup the slot is within, the association of certain physical servers with particular software licenses, based on the presence of other types of instances on certain servers, based on the performance characteristics of certain servers, and so forth. The selection of a slot can further be based on other factors that not specified by a user but rather based on criteria specified by the provider network 100. In some embodiments, the application of the preferences involves applying properties associated with a placement request, properties associated with candidate servers of a fleet, and possibly other system conditions as a weighted matrix calculation or other type of process that can rank available slots based on a weighted score generated for each available slot and/or physical server.

Once the ranker has selected a slot (for example, a slot with the highest ranking based on application of the power data and the user-specified preferences to the launch request properties), the placement service 114 returns an identification of the selected slot to the CM backend 112, as indicated at circle "3A" and, in some embodiments, further sends an indication that the slot has been (or will be) consumed to the CTS 111, as indicated at circle "3B."

As indicated at circle "3C," the ranker 314 performing the slot selection updates the candidate servers/slots data 302 to indicate that one of the slots in the candidate data was selected. Although not shown, the placement service 114 may also perform operations in response to instance terminations. For example, the CM backend 112 can send a message to the placement service 114 that indicates an instance was terminated. In response to the indication, the placement service 114 can update the respective candidate servers/slots data 302 to include the slot. In certain embodiments, placement service 114 operates at a sub-lineup level. For example, with ranker 314 (e.g., an algorithm used by the ranker) determining that a certain sub-lineup (e.g., set of servers) (e.g., within a lineup that is not overloaded) is less desirable (e.g., deprioritized but still available) for placement because the circuit breaker that serves that sub-lineup is too highly loaded. As another example, with placement service 114 (e.g., a filter thereof) determining that a certain sub-lineup (e.g., set of servers) (e.g., within a lineup that is not overloaded) is not available for placement (e.g., not one of candidates 302) because the circuit breaker that serves that sub-lineup is too highly loaded.

As indicated above, in some embodiments, users may also provide custom code or other user-created logic that the user desires to be executed as part of the placement determination. For example, a user can create user-generated placement code 318 that is executed by the placement service 114, or executed by one or more auxiliary services 316 (for example, a hardware virtualization service, a container service, etc.) of a provider network 100 upon invocation of the code by the placement service 114. The user-generated placement code 318 can be configured to use input indicating placement preferences (e.g., rules) based on power data, launch request properties, available slot information, current system conditions, and/or other parameters specific to a user's computing environment to rank available slots or servers according to custom logic. The placement service 114, for example, may provide an API that enables such user logic to obtain slot information, system properties, and possibly other information, and to send requests specifying placement determinations.

In some embodiments, a provider network 100 may provide one or more GUIs that enable a user (e.g., or a service provider, but not their users) to view information related to where instances are being placed. For example, a user (e.g., service provider) can access a GUI or other interface that provides power data and/or an indication of the filters/weighted values that were applied to one or more launch requests and an indication of how those values resulted in the selection of a particular slot. In this manner, a user (e.g., service provider) can better understand and diagnose issues related to power aware placement decisions.

Although the example in FIG. 1 illustrates an environment that enables users of a service provider to configure one or more virtualized computing resource preferences to be used along with power data for a fleet of physical servers located at one or more service provider managed data centers to place virtualized computing resources into the fleet of physical servers, the methods described herein can also be used in environments where some or all of the physical servers are located at one or more customer networks that are separate from the service provider networks.

Figure 4:
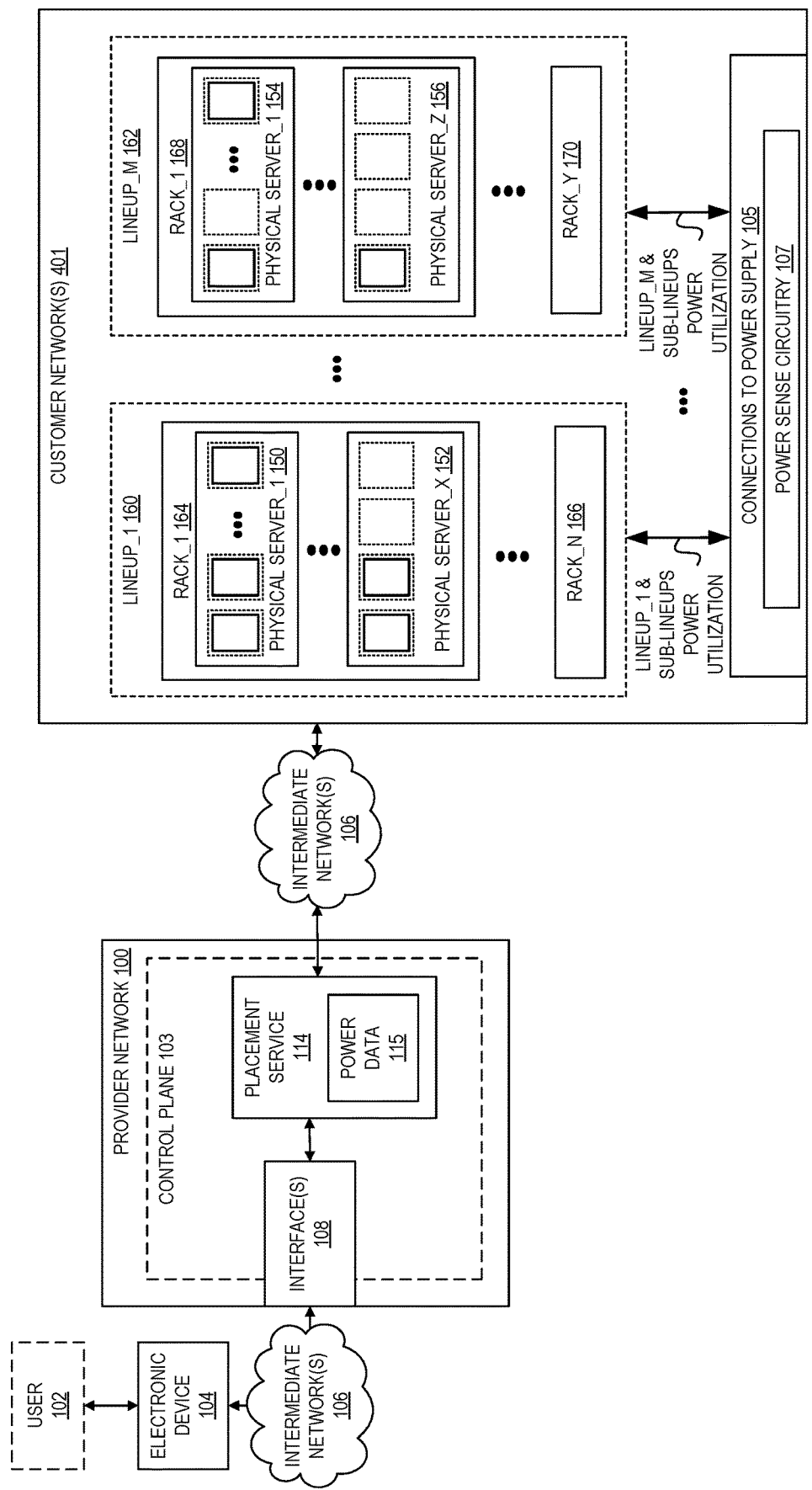
FIG. 4 is a diagram illustrating an environment that enables users to configure one or more virtualized computing resource preferences to be used along with power data for a fleet of on-premises physical servers to place virtualized computing resources into the fleet of on-premises physical servers according to some embodiments.

FIG. 4 is a diagram illustrating an environment that enables users to configure one or more virtualized computing resource preferences to be used along with power data for a fleet of on-premises physical servers to place virtualized computing resources into the fleet of on-premises physical servers according to some embodiments. In certain embodiments, the customer network 401 includes (e.g., and is able to provide power data at a same granularity) a plurality of sub-lineups in each lineup, for example, as shown in FIGS. 2B and 2C.

As shown, a fleet of physical servers (for example, including physical servers 150, 152, 154, and 156) is located at one or more data centers or other locations within one or more customer networks 401 (or other edge location that is separate from the provider network 100). In some embodiments, a service provider offers services, infrastructure, and operating models to virtually any data center or other on-premises facility. In some examples, users can use the same APIs, tools, hardware, and the same functionality across on-premises and resources in a provider network 100 as a hybrid experience. For example, users might desire to use on-premises hardware to support workloads benefiting from low latency or local data processing needs, among other reasons. In some embodiments, the physical servers of the fleet may be purchased or otherwise obtained from the service provider and installed in a customer-managed network, or the physical servers may be obtained from other sources and configured to interface with the provider network 100.

In some embodiments, a provider network 100 enables users to manage the use of virtualized computing resources at the fleet of physical servers located within customer network 401 in much the same way as if the servers were housed at a data center managed by the service provider. For example, users can use interface(s) 108 to launch virtualized computing resources onto physical servers, to configure virtualized computing resource preferences, manage executing resources, among other operations, while allowing the service provider to obtain and processes power utilization for each (e.g., individually powered) lineup of servers in the customer network 401 to provide power aware load placement of virtualized computing resources into the servers in the customer network 401. A customer may include their own placement policy, power utilization threshold, etc. as an input into placement service 114.

In certain embodiments, a fleet of physical servers may be used for both "compute" type of instances and "storage" type of instances. The embodiments herein may be used with some embodiments, for example, to move compute instances to balance the power in each lineup and/or sub-lineup (and to avoid moving storage type of instances).

In certain embodiments, the power data is used as discussed herein to monitor each lineup and/or sub-lineup and enable a placement service to slow/stop load placement on certain lineups and/or sub-lineups that are at (or are approaching) a (e.g., preset) power utilization threshold. In certain embodiments, power aware load placement thus makes the load placement process smarter, reduces the cost, and safely pushes the utilization of each lineup and/or sub-lineup higher. In certain embodiments, a more even power distribution among lineups and/or sub-lineups means the losses, power consumption, and heat generated by the equipment follows the same pattern, and thus, the temperature profile among different lineups and/or sub-lineups will be closer.

The power utilization threshold may be required (e.g., limited) by particular hardware, e.g., from a particular power circuit's rating (e.g., maximum rated power).

Certain placement services may include physical resources (referred to generally as a "catcher") to transfer electrical loads to in case the utilization on any lineup and/or sub-lineup exceeds its (e.g., design) threshold. Certain embodiments herein allow a placement service to determine a trend in the utilization change on the lineups and/or sub-lineups and provides an opportunity to take the necessary actions to avoid the use of the catcher. Certain embodiments herein allow a placement system to protect against a power increase that can pose a risk to the power system.

Each rack of a power supply may include a power supply unit (PSU) managing the output load on the PSUs by systematically shedding and reactivating PSUs that are configured with a common load based on the amount of that load. This may include actively managing (e.g., activating and deactivating) PSUs based on loading conditions so that active PSUs operate in a high-efficiency regime, thus improving overall efficiency in a datacenter environment. In addition, various embodiments are to monitor efficiency losses in the PSU, predict output load peaks and valleys, and manage PSU availability based on these predicted load requirements to increase average efficiency over time.

Figure 5:
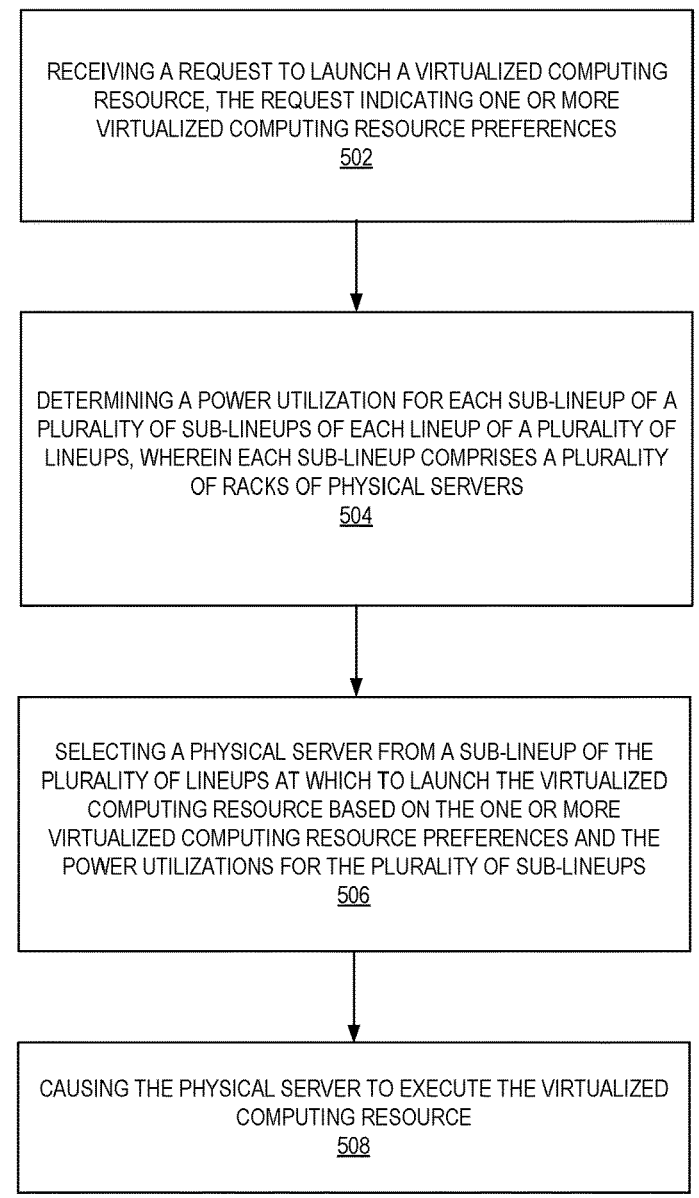
FIG. 5 is a flow diagram illustrating operations of a method for selecting a physical server from a sub-lineup of a plurality of sub-lineups at which to launch a virtualized computing resource based on one or more virtualized computing resource preferences and power utilizations for the plurality of sub-lineups according to some embodiments.

FIG. 5 is a flow diagram illustrating operations 500 of a method for selecting a physical server from a sub-lineup of a plurality of lineups at which to launch a virtualized computing resource based on one or more virtualized computing resource preferences and power utilizations for the plurality of sub-lineups according to some embodiments.

Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a placement service 114 of the other figures.

The operations 500 include, at block 502, receiving a request to launch a virtualized computing resource, the request indicating one or more virtualized computing resource preferences. Referring to FIG. 1, for example, a user 102 can provide the request via interface(s) 108 indicating virtualized computing resource preferences.

The operations 500 further include, at block 504, determining a power utilization for each sub-lineup of a plurality of sub-lineups of each lineup of a plurality of lineups, wherein each sub-lineup comprises a plurality of racks of physical servers. For example, the power utilization data from power sense circuitry 107 (e.g., sub-lineup power sense circuitry 107C-107H in FIGS. 2A-2C) can be requested (e.g., in response to the request at block 502) by placement service 114 for the (e.g., current) power status of the fleet 101 in FIG. 1.

The operations 500 further include, at block 506, selecting a physical server from a sub-lineup of the plurality of lineups at which to launch the virtualized computing resource based on the one or more virtualized computing resource preferences and the power utilizations for the plurality of sub-lineups. For example, a placement service 114 can select the physical server.

The operations 500 further include, at block 508, causing the physical server to execute the virtualized computing resource. For example, an ICS 116 can cause the selected physical server to execute the virtualized computing resource (e.g., selected physical server 150 in one example discussed in reference to FIG. 1).

Figure 6:
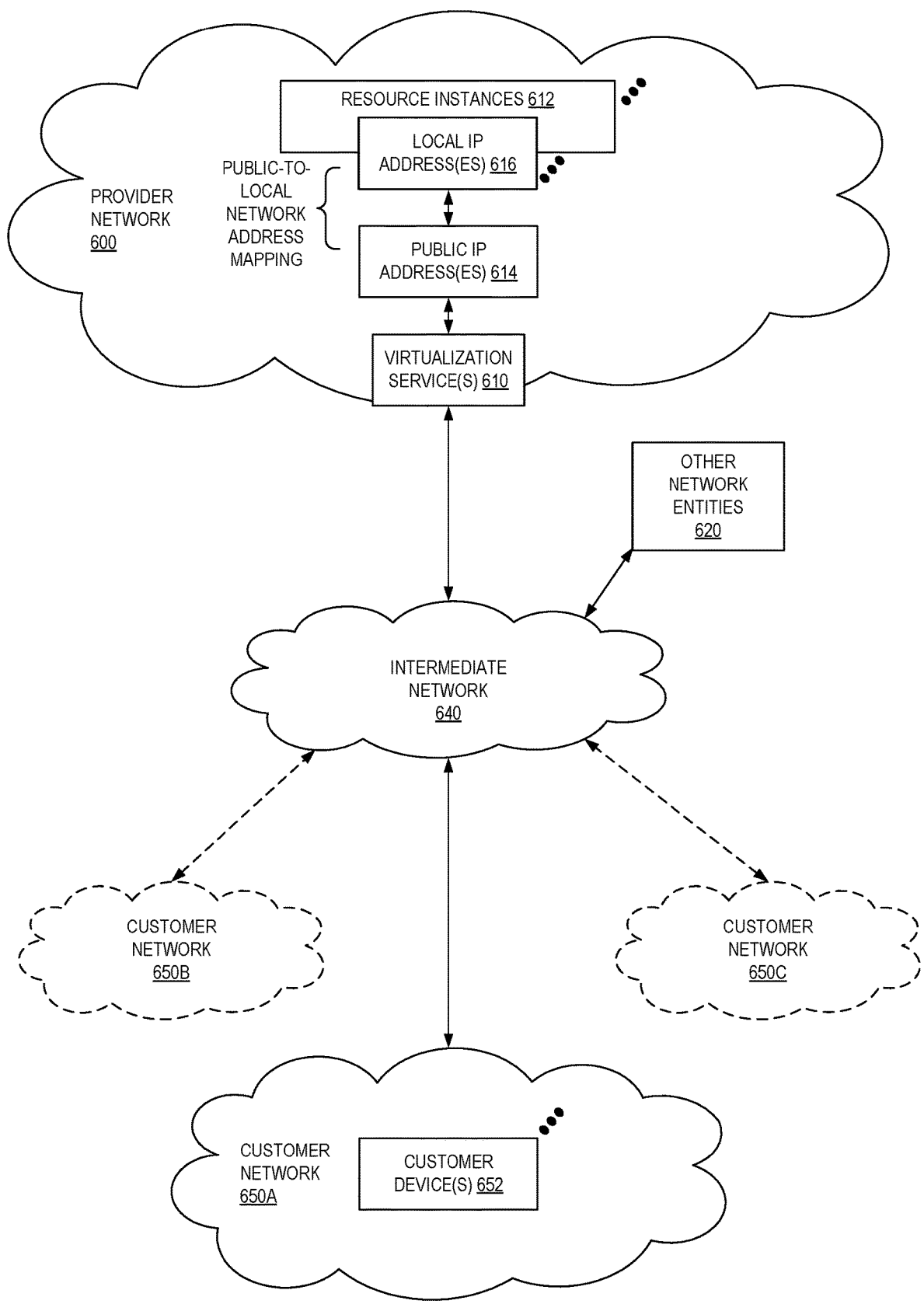
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
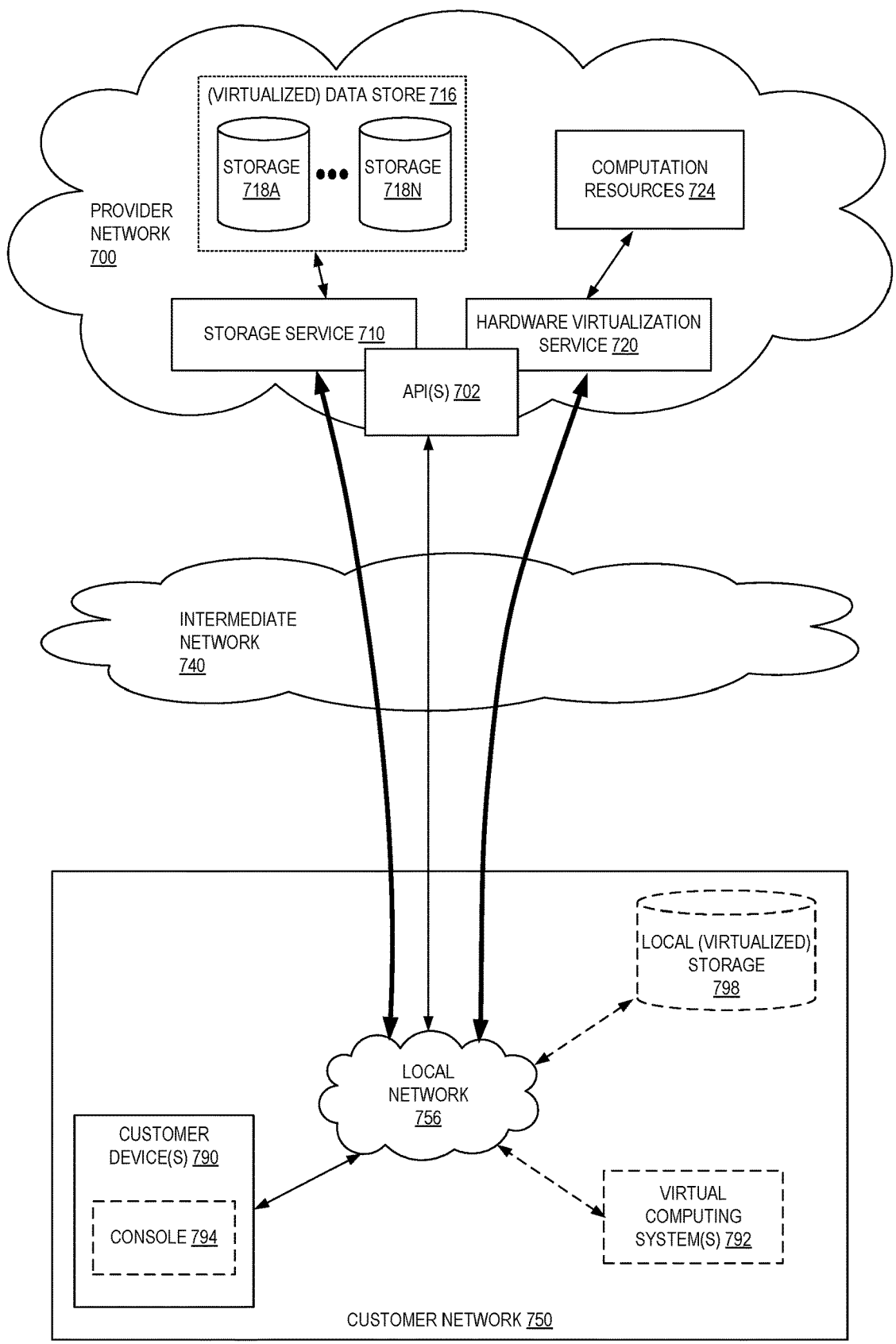
FIG. 7 is a block diagram of an example provider network that provides a storage service and a hardware virtualization service to users according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
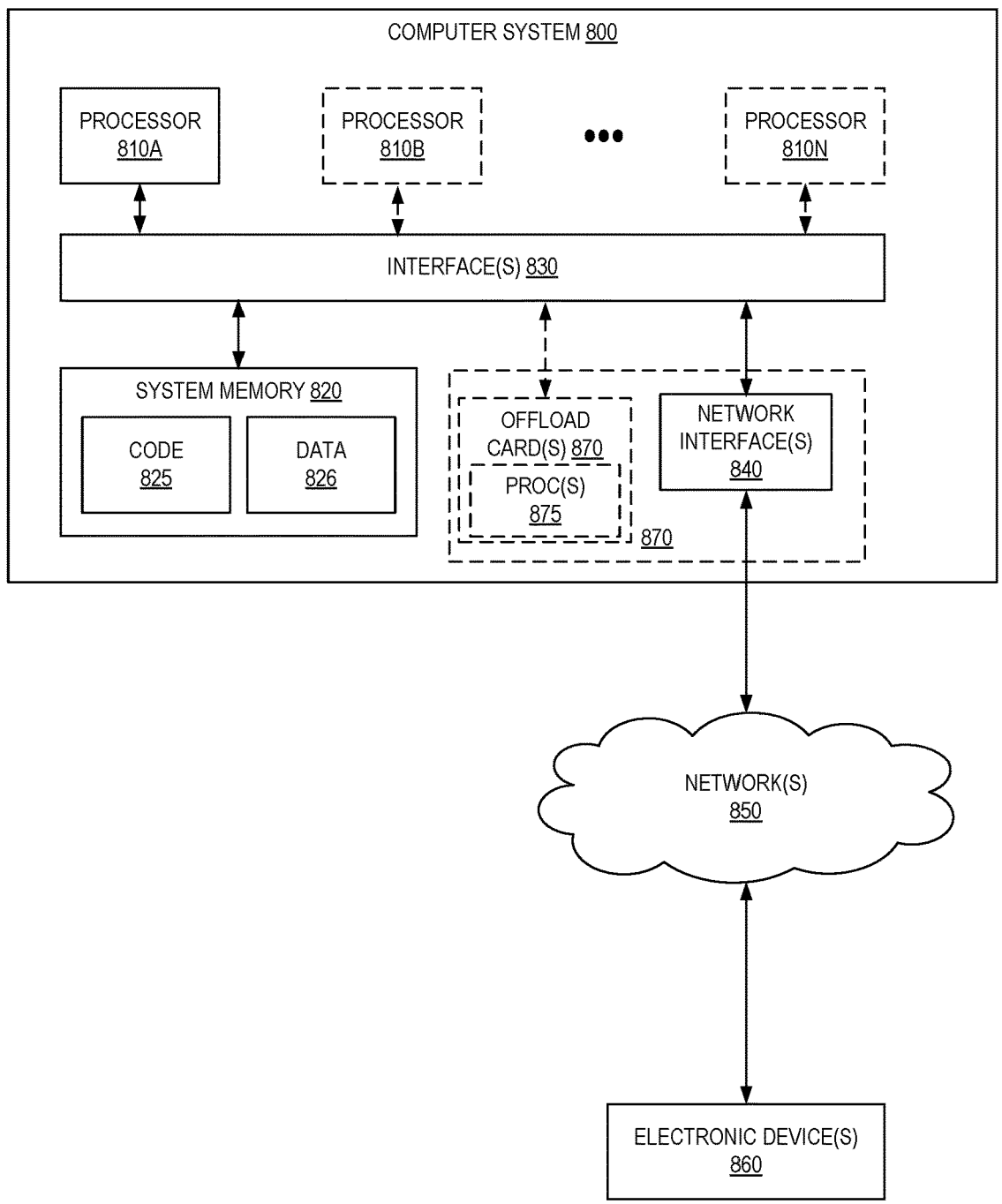
FIG. 8 is a block diagram illustrating an example computer system that may be used in some embodiments.

In some embodiments, a system that implements a portion or all of the techniques for enabling users of a service provider to manage preferences used to launch virtualized computing resources into a fleet of physical servers as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader scope of the disclosure as set forth in the claims.

What is claimed is:

1. A computer-implemented method comprising:
   receiving a request by a user of a cloud provider network to launch a virtual machine instance, the request indicating a user-specified preference of an instance type of the virtual machine instance;
   determining a power utilization for each sub-lineup of a plurality of sub-lineups of each lineup of a plurality of lineups, wherein each sub-lineup comprises a plurality of racks of physical servers, and each lineup is individually powered by its own connection to a utility substation;
   selecting a sub-lineup for the virtual machine instance based at least in part on the power utilizations for the plurality of sub-lineups;
   selecting a virtual machine slot for the virtual machine instance from a plurality of candidate virtual machine slots of the physical servers of the sub-lineup based on the user-specified preference; and
   causing the virtual machine slot of a physical server of the sub-lineup to execute the virtual machine instance.

2. The computer-implemented method of claim 1, further comprising determining a power utilization for each lineup of the plurality of lineups, wherein the selecting the sub-lineup for the virtual machine instance is also based on the power utilizations for the plurality of lineups.

3. The computer-implemented method of claim 1, further comprising:
   determining a power utilization for each lineup of the plurality of lineups; and
   sending only a largest power utilization of a lineup and its sub-lineups, based on their respective power utilization threshold, to a placement service of the cloud provider network for each lineup,
   wherein the selecting the sub-lineup for the virtual machine instance by the placement service is based on the largest power utilizations.

4. A computer-implemented method comprising:
   receiving a request to launch a virtualized computing resource, the request indicating one or more virtualized computing resource preferences;
   determining a power utilization for each sub-lineup of a plurality of sub-lineups of each lineup of a plurality of lineups, wherein each sub-lineup comprises a plurality of racks of physical servers, and each lineup is individually powered by its own connection to a utility substation;
   selecting a physical server from a sub-lineup of the plurality of lineups at which to launch the virtualized computing resource based on the one or more virtualized computing resource preferences and the power utilizations for the plurality of sub-lineups; and
   causing the physical server to execute the virtualized computing resource.

5. The computer-implemented method of claim 4, further comprising determining a power utilization for each lineup of the plurality of lineups, wherein the selecting the physical server from the sub-lineup for the virtualized computing resource is also based on the power utilizations for the plurality of lineups.

6. The computer-implemented method of claim 4, further comprising:
   determining a power utilization for each lineup of the plurality of lineups; and
   sending only a largest power utilization of a lineup and its sub-lineups, based on their respective power utilization threshold, to a placement service,
   wherein the selecting the physical server from the sub-lineup for the virtualized computing resource by the placement service is based on the largest power utilizations.

7. The computer-implemented method of claim 6, wherein each power utilization threshold of a lineup is a rating of a circuit breaker feeding that lineup separately from another lineup, and each power utilization threshold of a sub-lineup is a rating of a circuit breaker feeding that sub-lineup separately from another sub-lineup.

8. The computer-implemented method of claim 7, wherein each circuit breaker rating is a current rating.

9. The computer-implemented method of claim 7, wherein each circuit breaker sends its circuit breaker rating to the placement service that is selecting the physical server from the sub-lineup of the plurality of lineups at which to launch the virtualized computing resource.

10. The computer-implemented method of claim 7, further comprising determining, by the placement service that is selecting the physical server from the sub-lineup of the plurality of lineups at which to launch the virtualized computing resource, the circuit breaker rating for each circuit breaker from a lineup topology that indicates the circuit breaker and the physical servers of each lineup and each sub-lineup.

11. The computer-implemented method of claim 4, wherein each lineup is coupled to a separate power transformer of a plurality of power transformers.

12. The computer-implemented method of claim 4, wherein the determining the power utilization for each sub-lineup of the plurality of lineups comprises determining an average power utilized by each sub-lineup for a time period.

13. The computer-implemented method of claim 4, further comprising moving one or more virtualized computing resources to a different sub-lineup to rebalance power utilization of each sub-lineup of the plurality of sub-lineups.

14. The computer-implemented method of claim 4, wherein the selecting the sub-lineup comprises selecting the sub-lineup having a lowest power utilization of the power utilizations of the plurality of sub-lineups.

15. A system comprising:
   a plurality of racks of physical servers; and
   a control plane service of a provider network implemented by one or more electronic devices, the control plane service including instructions that upon execution cause the control plane service to:
      receive a request to launch a virtualized computing resource, the request indicating one or more virtualized computing resource preferences,
      determine a power utilization for each sub-lineup of a plurality of sub-lineups of each lineup of a plurality of lineups, wherein each sub-lineup comprises a proper subset of racks of the plurality of racks of physical servers, and each lineup is individually powered by its own connection to a utility substation,
      select a physical server from a sub-lineup of the plurality of lineups at which to launch the virtualized computing resource based on the one or more virtualized computing resource preferences and the power utilizations for the plurality of sub-lineups, and
      cause the physical server to execute the virtualized computing resource.

16. The system of claim 15, wherein the instructions, upon execution, further cause the control plane service to determine a power utilization for each lineup of the plurality of lineups, wherein the selection of the physical server from the sub-lineup for the virtualized computing resource is also based on the power utilizations for the plurality of lineups.

17. The system of claim 15, wherein the instructions, upon execution, further cause the control plane service to:
- determine a power utilization for each lineup of the plurality of lineups; and
- send only a largest power utilization of a lineup and its sub-lineups, based on their respective power utilization threshold, to a placement service,
- wherein the selection of the physical server from the sub-lineup for the virtualized computing resource by the placement service is based on the largest power utilizations.

18. The system of claim 17, wherein each power utilization threshold of a lineup is a rating of a circuit breaker feeding that lineup separately from another lineup, and each power utilization threshold of a sub-lineup is a rating of a circuit breaker feeding that sub-lineup separately from another sub-lineup.

19. The system of claim 15, wherein each lineup is coupled to a separate power transformer of a plurality of power transformers.

20. The system of claim 15, wherein the determine of the power utilization for each sub-lineup of the plurality of sub-lineups comprises determining an average power utilized by each sub-lineup for a time period.

* * * * *